United States Patent
Park

(10) Patent No.: US 10,285,143 B2
(45) Date of Patent: May 7, 2019

(54) WIRELESS COMMUNICATION DEVICE SUPPORTING COMMUNICATION SCHEMES AND OPERATING METHOD THEREOF

(71) Applicant: Samsung Electronics Co., Ltd., Gyeonggi-do (KR)

(72) Inventor: Jaehyeon Park, Gyeonggi-do (KR)

(73) Assignee: Samsung Electronics Co., Ltd (KR)

( * ) Notice: Subject to any disclaimer, the term of this patent is extended or adjusted under 35 U.S.C. 154(b) by 247 days.

(21) Appl. No.: 15/041,779

(22) Filed: Feb. 11, 2016

(65) Prior Publication Data

US 2016/0234797 A1 Aug. 11, 2016

(30) Foreign Application Priority Data

| Feb. 11, 2015 | (KR) | 10-2015-0020686 |
| Oct. 20, 2015 | (KR) | 10-2015-0146278 |
| Dec. 18, 2015 | (KR) | 10-2015-0182014 |

(51) Int. Cl.
| *H04J 3/06* | (2006.01) |
| *H04W 56/00* | (2009.01) |
| *H04L 7/00* | (2006.01) |
| *H04W 88/06* | (2009.01) |

(52) U.S. Cl.
CPC ......... *H04W 56/001* (2013.01); *H04L 7/0008* (2013.01); *H04W 88/06* (2013.01)

(58) Field of Classification Search
CPC .... H04W 56/001; H04W 88/06; H04L 7/0008
See application file for complete search history.

(56) References Cited

U.S. PATENT DOCUMENTS

| 7,907,581 | B2 | 3/2011 | Roh et al. |
| 8,144,810 | B2 | 3/2012 | Gronemeyer et al. |
| 8,254,365 | B2 | 8/2012 | Storm et al. |
| 8,301,195 | B2 | 10/2012 | Warren et al. |
| 8,750,324 | B2 | 6/2014 | Hansquine et al. |
| 2012/0329395 | A1 | 12/2012 | Husted et al. |
| 2013/0252553 | A1 | 9/2013 | Hyon et al. |
| 2013/0258931 | A1 | 10/2013 | Gonikberg et al. |

FOREIGN PATENT DOCUMENTS

| JP | 2008258706 | 10/2008 |
| KR | 1020090096118 | 9/2009 |

*Primary Examiner* — Bo Hui A Zhu
(74) *Attorney, Agent, or Firm* — The Farrell Law Firm, P.C.

(57) ABSTRACT

Methods and devices are provided, where the device includes a plurality of wireless communication units. The wireless communication device also includes a first interface unit configured to synchronize a data signal received from one of the plurality of wireless communication units with a first clock corresponding to the one of the plurality of wireless communication units, and configured to output the synchronized data signal to a second interface unit. The second interface unit is configured to receive the synchronized data signal using a second clock having a shorter period than the first clock, count a number of periods of the second clock during at least one period of the first clock, and determine an output port for the synchronized data signal based on a result of the counting. The wireless communication device further includes a plurality of processors for processing data signals.

20 Claims, 19 Drawing Sheets

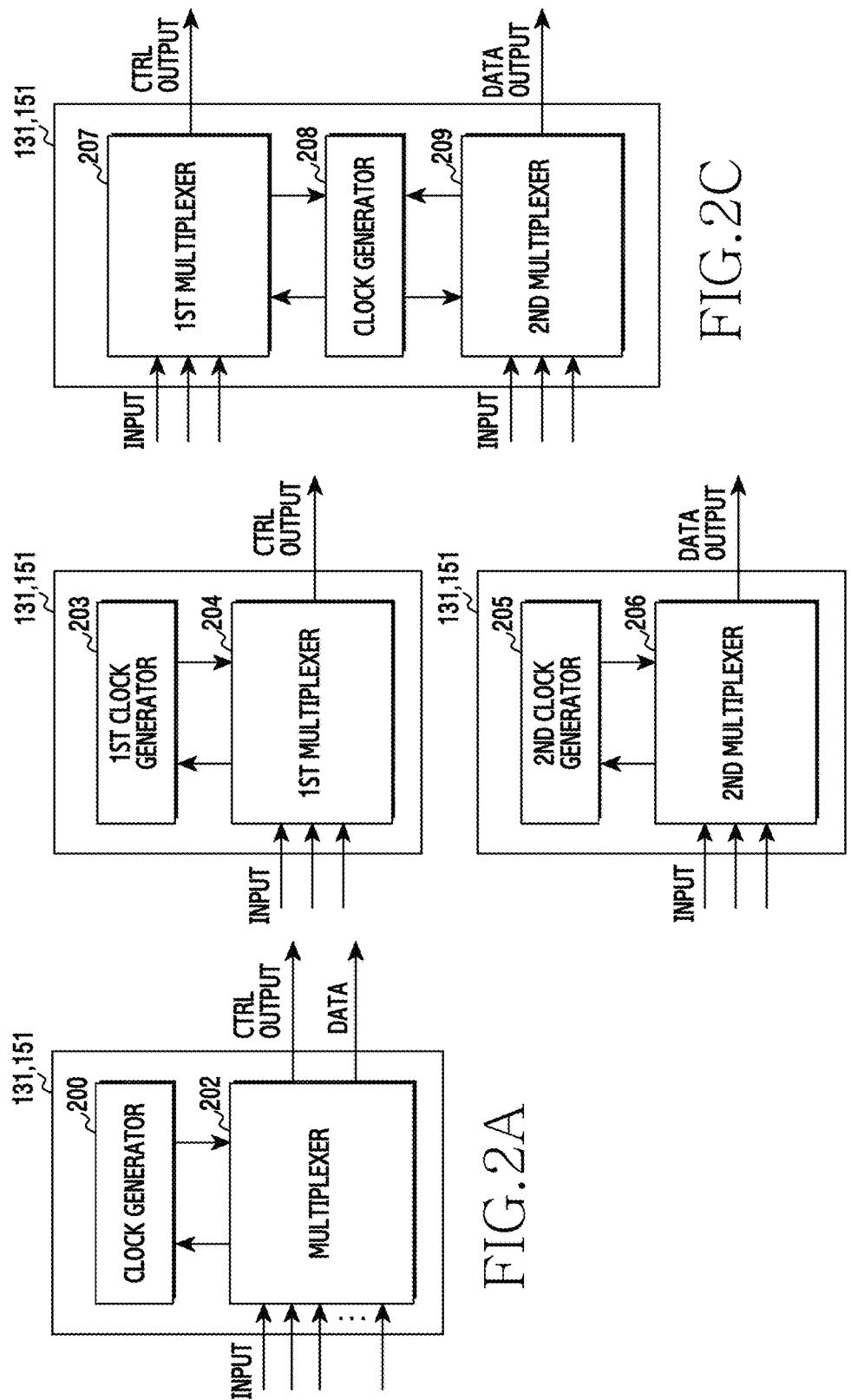

WIRELESS COMMUNICATION DEVICE SUPPORTING COMMUNICATION SCHEMES AND OPERATING METHOD THEREOF

PRIORITY

This application claims priority under 35 U.S.C. § 119(a) to Korean Patent Application Serial No. 10-2015-0020686, which was filed in the Korean Intellectual Property Office on Feb. 11, 2015, to Korean Application Serial No. 10-2015-0146278, which was filed in the Korean Intellectual Property Office on Oct. 20, 2015, and Korean Application Serial No. 10-2015-0182014, which was filed in the Korean Intellectual Property Office on Dec. 18, 2015, the contents of which are incorporated herein by reference.

BACKGROUND

1. Field of the Disclosure

The present disclosure relates generally to a wireless communication device and, more particularly, to a wireless communication device supporting two or more communication schemes.

2. Description of the Related Art

Wireless communication devices perform wireless communication using a plurality of communication schemes such as, for example, a wireless local area network (WLAN) communication scheme, a Bluetooth (BT) communication scheme, a near field communication (NFC) communication scheme, a global positioning system (GPS) or cellular communication scheme (e.g., long term evolution (LTE), LTE-advanced (LTE-A), code division multiple access (CDMA), wideband CDMA (WCDMA), universal mobile telecommunication system (UMTS), wireless broadband (WiBro), or global system for mobile communication (GSM)). The wireless communication device further includes a broadcast receiving unit (e.g., a digital multimedia broadcasting (DMB)) and frequency modulation (FM) radio receiver), to receive a broadcasting signal or radio signal.

A wireless communication device wirelessly communicates with other communication devices based on WLAN signals, Bluetooth signals, and/or cellular communication signals. For example, a plurality of laptops, netbook computers, mobile terminals, and tablet devices wirelessly connect to networks such as, for example, the Internet and/or private networks, using WLAN signals (also commonly referred to as WiFi signals), and communicate with local BT-enabled devices such as, for example, headsets, printers, and scanners, using bluetooth signals. Also, the wireless communication device, which may be embodied as a smart phone or a and mobile terminal, may wirelessly communicate based on a corresponding communication protocol.

These communication functions are implemented in one module (for example, a system on chip (SoC) or a network on chip (NoC)) of the wireless communication device, or are implemented in separate respective modules of the wireless communication device.

A control module (e.g., a processor) is also included in the wireless communication device. The control module is coupled with at least one module (for example, a communication module) in order to perform a plurality of communication functions, and to process data received through a corresponding communication function or data that is to be transmitted. The control module forwards data through a data bus, which corresponds to the at least one module performing the plurality of communication functions.

At least one communication module performing the communication functions and a control module are connected through at least one interface. For example, the at least one communication module and the control module require a number of interfaces that corresponds corresponding to a number of the communication modules performing the communication functions. For example, four sub modules performing four communication functions and a control module are connected through four interfaces.

SUMMARY

An aspect of the present disclosure provides an apparatus and a method for forwarding data by using a common interface between a plurality of communication modules and a control module in a wireless communication device.

According to an embodiment of the present disclosure, a wireless communication device is provided that includes a plurality of wireless communication units. Each wireless communication unit enables communication using wireless signals of a different respective frequency. The wireless communication device also includes a first interface unit configured to synchronize a data signal received from one of the plurality of wireless communication units with a first clock corresponding to the one of the plurality of wireless communication units, and configured to output the synchronized data signal to a second interface unit. The wireless communication device also includes the second interface unit configured to receive the synchronized data signal using a second clock having a shorter period than the first clock, count a number of periods of the second clock during at least one period of the first clock, and determine an output port for the synchronized data signal based on a result of counting the number of periods of the second clock. The wireless communication device further includes a plurality of processors for processing data signals, each processor corresponding to a respective output port of the second interface unit.

According to an embodiment of the present disclosure, an operating method of a wireless communication device is provided. Communication is performed through a plurality of wireless communication units. Each wireless communication unit uses wireless signals of a different respective frequency. Through a first interface unit, a data signal received from one of the plurality of wireless communication units, is synchronized with a first clock corresponding to the one of the plurality of wireless communication units. The synchronized data signal is output from the first interface unit to a second interface unit. Through the second interface unit, the synchronized data signal is received using a second clock having a shorter period than the first clock. The second interface unit counts a number of periods of the second clock during at least one period of the first clock. An output port for the synchronized data signal is determined based on a result of counting the number of periods of the second clock. Data signals are processed through a plurality of processors. Each processor corresponds to a respective output port of the second interface unit.

According to an embodiment of the present disclosure, a terminal is provided that includes a plurality of wireless communication units. The terminal also includes a first interface unit configured receive data signals from the plurality of wireless communication units, synchronize a given data signal with a first clock corresponding to a wireless communication unit from which the given data signal was received, and output synchronized data signals. The terminal also includes a second interface unit configured to receive the synchronized data signals, and configured to determine one of a plurality of output ports for a given synchronized data signal based on a second clock. The terminal further includes a plurality of processors configured to receive the synchronized data signals from the second interface unit, each processor corresponding to a respective output port of the second interface unit.

BRIEF DESCRIPTION OF THE DRAWINGS

The above and other aspects, features, and advantages of the present disclosure will become more apparent from the following detailed description when taken in conjunction with the accompanying drawings, in which:

FIG. 2A to FIG. 2C are block diagrams illustrating transmission interface units in a wireless communication device, according to embodiments of the present disclosure;

DETAILED DESCRIPTION OF EMBODIMENTS

Figure 1:
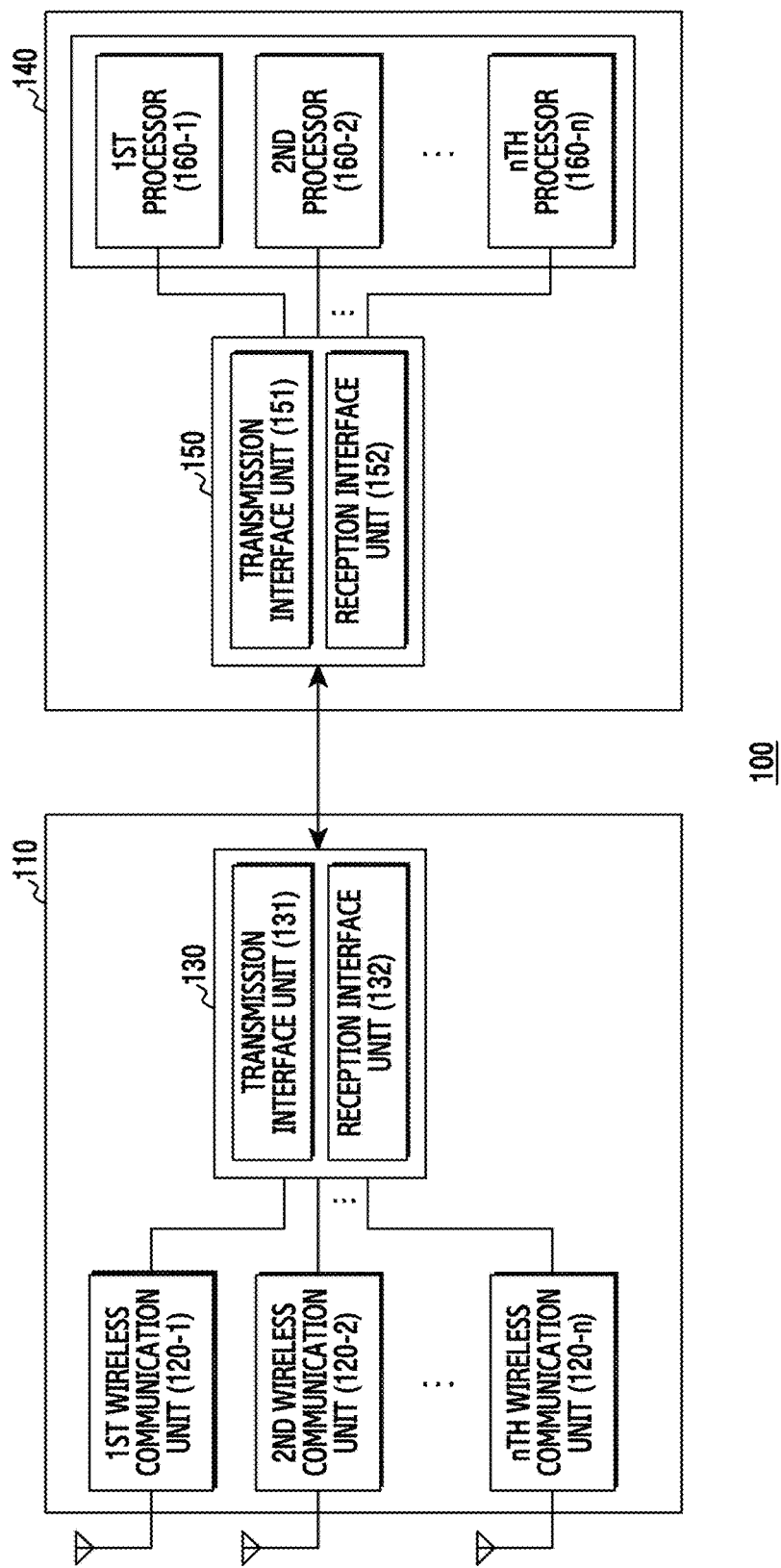
FIG. 1 is a block diagram illustrating a wireless communication device, according to an embodiment of the present disclosure.

Embodiments of the present disclosure are described in detail with reference to the accompanying drawings. The same or similar components may be designated by the same or similar reference numerals although they are illustrated in different drawings. Detailed descriptions of constructions or processes known in the art may be omitted to avoid obscuring the subject matter of the present disclosure.

A wireless communication device, according to embodiments of the present disclosure, may be embodied as an electronic device including a communication function. For example, the electronic device may be embodied as at least one of a smart phone, a tablet personal computer (PC), a mobile phone, a video phone, an electronic book (e-book) reader, a desktop PC, a laptop PC, a netbook computer, a personal digital assistant (PDA), a portable multimedia player (PMP), an MPEG audio layer 3 (MP3) player, a mobile medical device, a camera, or a wearable device (e.g., a head-mounted device (HMD) such as electronic glasses, electronic clothing, an electronic bracelet, an electronic necklace, an electronic appcessory, an electronic tattoo, or a smart watch).

According to embodiments of the present disclosure, the electronic device may be embodied as a smart home appliance having a communication function. The smart home appliance may be, for example, at least one of a television, a digital versatile disc (DVD) player, an audio system, a refrigerator, an air conditioner, a cleaner, an oven, a microwave, a washing machine, an air cleaner, a set-top box, a TV box, a game console, an electronic dictionary, an electronic locking system, a camcorder, or an electronic picture frame.

According to embodiments of the present disclosure, the electronic device may include at least one of various medical devices (e.g., magnetic resonance angiography (MRA), magnetic resonance imaging (MRI), computerized tomography (CT), a moving-camera, an ultrasonic machine, etc.), a navigation device, a GPS receiver, an event data recorder (EDR), a flight data recorder (FDR), a car infotainment device, electronic equipment for ship (e.g., a navigation device for ship and a gyrocompass, etc.), avionics, a security device, a head unit for vehicle, an industrial or home service robot, an automated teller machine (ATM) of a financial institution, or a point of sale (POS) device of a shop.

According to embodiments of the present disclosure, the electronic device may include at least one of a part of furniture or building/structure including a communication function, an electronic board, an electronic signature receiving device, a projector, or various metering devices (e.g., tap water, electricity, gas, or radio wave metering device, etc.). The electronic device, according to embodiments of the present disclosure, may be one of the aforementioned various devices or a combination of two or more of them. Also, the electronic device, according to embodiments of the present disclosure may be a flexible device. Also, it is obvious to those skilled in the art, that the electronic device, according to embodiments of the present disclosure, is not limited to the aforementioned devices.

Embodiments of the present disclosure described in detail below describe an apparatus and a method for using a single bit data interface to process a data signal in a wireless communication device supporting two or more communication schemes.

Particularly, embodiments of the present disclosure relate to an apparatus and a method for using a single bit data interface, between a communication module and a control module, to detect a frequency corresponding to a communication scheme in a wireless communication device supporting a plurality of communication schemes.

In a communication system, serial communication transmits data in units of one bit at one time via a communication channel or a data bus. Serial communication may be compared with parallel communication. Parallel communication sends many bits concurrently on a link having many parallel channels. Also, integrated circuits become more expensive with a greater number of pins. In order to decrease the number of the pins, integrated circuits may use a serial bus to transmit data, in an environment in which speed is less of a priority. In a computer environment, a serial port is a single bit interface capable of exchanging information in units of one bit at one time. The conventional art uses a predefined frequency for information exchange of a communication system, to perform data communication by each communication scheme. However, embodiments of the present disclosure provide an apparatus and a method for recognizing a frequency of a corresponding communication scheme, and performing data communication based on the corresponding communication scheme.

FIG. 1 is a block diagram illustrating a wireless communication device, according to an embodiment of the present disclosure.

Referring to FIG. 1, a wireless communication device 100 includes a communication module 110 and a control module 140. The communication module 110 includes a plurality of wireless communication units 120-1 to 120-n and a first interface unit 130. The control module 140 includes a second interface unit 150 and a plurality of processors 160-1 to 160-n.

The plurality of wireless communication units 120-1 to 120-n and the first interface unit 130 may be implemented as a single module, for example, as an SoC or NoC. According to the implementation, the plurality of wireless communication units 120-1 to 120-n may be also implemented as separate modules. Alternatively, some wireless communication units may be implemented as separate modules, while other wireless communication units are implemented as a single module.

The plurality of processors 160-1 to 160-n and the second interface unit 150 may be implemented as a single module, for example, as an SoC or an NoC. According to the implementation, the plurality of processors 160-1 to 160-n may be implemented as separate modules. Alternatively, some processors may be implemented as separate modules, while other processors are implemented as a single module.

Each of the plurality of wireless communication units 120-1 to 120-n may convert an RF signal into a baseband signal based on a corresponding communication scheme, demodulate the baseband signal, and output a digital signal.

All or some constituent elements of a corresponding wireless communication unit may be included in the communication module 110, and other constituent elements of the corresponding wireless communication unit may be included in the control module 140.

The first interface unit 130 includes a transmission interface unit 131 and a reception interface unit 132.

The transmission interface unit 131 may synchronize digital signals (e.g., control signals or data signals) received from the plurality of wireless communication units 120-1 to 120-n, to clocks of the wireless communication units 120-1 to 120-n, and output the synchronized signals to the control module 140. The clock may have a higher clock period than that of the wireless communication unit having the highest frequency among the wireless communication units. That is, the clock may have a higher bandwidth than that of the wireless communication unit having the highest frequency among the wireless communication units.

The reception interface unit 132 may receive data processed digital signals from the control module 140, and determine clock periods of the digital signals outputted from the control module 140. The reception interface unit 132 may output the digital signals to the wireless communication units in accordance with the determined clock periods.

The second interface unit 150 includes a transmission interface unit 151 and a reception interface unit 152.

The transmission interface unit 151 synchronizes digital signals (e.g., control signals or data signals) received from the corresponding processors 160-1 to 160-n, to clocks of the wireless communication units 120-1 to 120-n, and outputs the synchronized signals to the communication module 110. The clock may have a higher clock period than that of the wireless communication unit having the highest frequency among the wireless communication units. That is, the clock may have a higher bandwidth than that of the wireless communication unit having the highest frequency among the wireless communication units.

The reception interface unit 152 receives digital signals from the communication module 110, determines clock periods of the digital signals, and outputs the digital signals to the processors 160-1 to 160-n corresponding to the determined clock periods.

The plurality of processors 160-1 to 160-n receive digital signals from the plurality of wireless communication units 120-1 to 120-n and perform corresponding data processing. For example, the plurality of processors 160-1 to 160-n may use a codec corresponding to a corresponding communication scheme, to restore received digital data to the original data or compress the original data.

FIG. 2A to FIG. 2C are block diagrams illustrating transmission interface units in a wireless communication device, according to embodiments of the present disclosure.

Referring to FIG. 2A, the transmission interface unit 131, 151 includes a clock generator 200 and a multiplexer 202. The clock generator 200 generates a clock signal (or a clock frequency) corresponding to a wireless communication scheme, and supplies the generated clock signal to the multiplexer 202. For example, when the first wireless communication unit 120-1 uses a first clock frequency (f1), the second wireless communication unit 120-2 uses a second clock frequency (f2), and the $n^{th}$ wireless communication unit 120-n uses an $n^{th}$ clock frequency (fn), the first to $n^{th}$ wireless communication units 120-1 to 120-n may supply the first clock frequency (f1) to $n^{th}$ clock frequency (fn), to the multiplexer 202. The magnitudes of the clock frequencies (f1, f2, . . . , fn) may correspond to f1>f2 . . . >fn. Specifically, a period of the clock signal (f2) may be longer than that of the clock signal (f1), and a period of the clock signal (fn) may be longer than that of the clock signal (f2).

When a digital signal is inputted through at least one of a plurality of input ports, the multiplexer 202 selects one digital signal in accordance with a corresponding condition, synchronizes the selected digital signal to a clock supplied from the clock generator 200, and outputs the synchronized signal through a common output port. For example, if a data signal (data) or control signal (crt1) from the first wireless communication unit 120-1 is received through a first input port, the multiplexer synchronizes the data signal (data) or control signal (ctrl) of the first wireless communication unit 120-1 to a first clock signal, and outputs the synchronized signal through the common output port. The common output is shown to divide the data signal and the control signal, but the common output port may be implemented as a single output port, according to an embodiment of the present disclosure. Likewise, when a data signal (data) or control signal (ctrl) from the $n^{th}$ wireless communication unit 120-n is received through an $n^{th}$ input port, the multiplexer 202 synchronizes the data signal (data) and control signal (ctrl) of the $n^{th}$ wireless communication unit 120-n to an $n^{th}$ clock signal, and outputs the synchronized signal through the common output port.

As shown in FIG. 2A, the single multiplexer 202 outputs the data signal (data) and the control signal (ctrl). In FIGS. 2B and 2C, one of two multiplexers output the data signal (data) and the other multiplexer outputs the control signal (ctrl).

Referring to FIG. 2B, the transmission interface unit 131, 151 includes a first clock generator 203, a second clock generator 205, a first multiplexer 204, and a second multiplexer 206.

The first clock generator 203 and the second clock generator 205 generate clock signals (or clock frequencies) corresponding to wireless communication schemes, and supply the generated clock signals to the first multiplexer 204 and the second multiplexer 206, respectively.

When a digital control signal is inputted through at least one of a plurality of input ports, the first multiplexer 204 selects one digital control signal in accordance with a corresponding condition, synchronizes the selected digital control signal to a clock supplied from the first clock generator 203, and outputs the synchronized signal through a common output port. For example, if a control signal (ctrl) from the first wireless communication unit 120-1 is received through a first input port, the first multiplexer 204 synchronizes the control signal (ctrl) of the first wireless communication unit 120-1 to a first clock signal, and outputs the synchronized signal through the common output port. Likewise, if a control signal (ctrl) from the $n^{th}$ wireless communication unit 120-$n$ is received through an $n^{th}$ input port, the first multiplexer 204 synchronizes the control signal (ctrl) of the $n^{th}$ wireless communication unit 120-$n$ to an $n^{th}$ clock signal, and outputs the synchronized signal through the common output port.

When a digital data signal is inputted through at least one of a plurality of input ports, the second multiplexer 206 selects one digital data signal in accordance with a corresponding condition, synchronizes the selected digital data signal to a clock supplied from the second clock generator 205, and outputs the synchronized signal through a common output port. For example, if a data signal (data) from the first wireless communication unit 120-1 is received through a first input port, the second multiplexer 206 synchronizes the data signal (data) of the first wireless communication unit 120-1 to a first clock signal, and outputs the synchronized signal through the common output port. Similarly, if a data signal (data) from the $n^{th}$ wireless communication unit 120-$n$ is received through an $n^{th}$ input port, the second multiplexer 206 synchronizes the data signal (data) of the $n^{th}$ wireless communication unit 120-$n$ to an $n^{th}$ clock signal, and outputs the synchronized signal through the common output port.

As shown in FIG. 2B, the transmission interface unit 131, 151 supplies the clock signals to the respective multiplexers through the individual clock generators. However, as shown in FIG. 2C, the transmission interface unit 131, 151 may also supply clock signals to a plurality of multiplexers through one clock.

Referring to FIG. 2C, the transmission interface unit 131, 151 includes one clock generator 208, a first multiplexer 207, and a second multiplexer 209.

The clock generator 208 generates a clock signal (or clock frequency) corresponding to a wireless communication scheme, and supplies the clock signal to the first multiplexer 207 and the second multiplexer 209.

When a digital control signal is inputted through at least one of a plurality of input ports, the first multiplexer 207 selects a single digital control signal in accordance with a corresponding condition, synchronizes the selected digital control signal to a clock supplied from the clock generator 208, and outputs the synchronized signal through a common output port. For example, if a control signal (ctrl) from the first wireless communication unit 120-1 is received through a first input port, the first multiplexer 207 synchronizes the control signal (ctrl) of the first wireless communication unit 120-1 to a first clock signal, and outputs the synchronized signal through the common output port. Similarly, if a control signal (ctrl) from the $n^{th}$ wireless communication unit 120-$n$ is received through an $n^{th}$ input port, the first multiplexer 207 synchronizes the control signal (ctrl) of the $n^{th}$ wireless communication unit 120-$n$ to an $n^{th}$ clock signal, and outputs the synchronized signal through the common output port.

When a digital data signal is inputted through at least one of the plurality of input ports, the second multiplexer 209 selects a single digital data signal in accordance with a corresponding condition, synchronizes the selected digital data signal to a clock supplied from the clock generator 208, and outputs the synchronized signal through a common output port. For example, if a data signal (data) from the first wireless communication unit 120-1 is received through a first input port, the second multiplexer 209 synchronizes the data signal (data) of the first wireless communication unit 120-1 to a first clock signal, and outputs the synchronized signal through the common output port. Similarly, if a data signal (data) from the $n^{th}$ wireless communication unit 120-$n$ is received through an $n^{th}$ input port, the second multiplexer 209 synchronizes the data signal (data) of the $n^{th}$ wireless communication unit 120-$n$ to an $n^{th}$ clock signal, and outputs the synchronized signal through the common output port.

The clock signals generated in the clock generators of FIGS. 2A to 2C are used for transmitting digital signals in a transmit end, and may not be provided to a receive end.

Figure 3A:
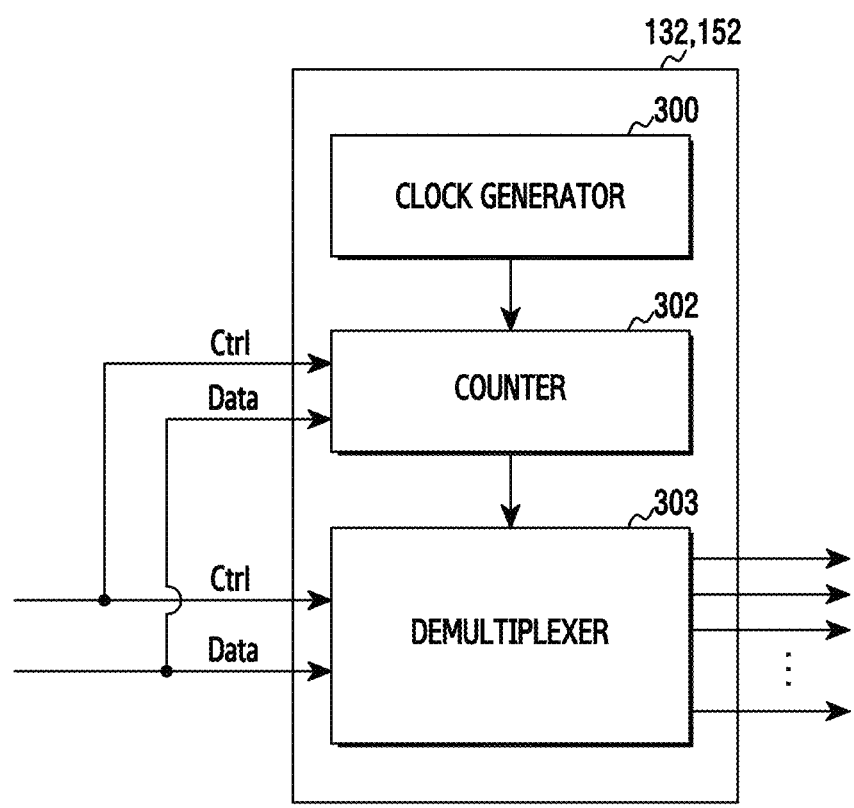
FIG. 3A to FIG. 3C are block diagrams illustrating reception interface units in a wireless communication device, according to embodiments of the present disclosure.
Figure 3B:
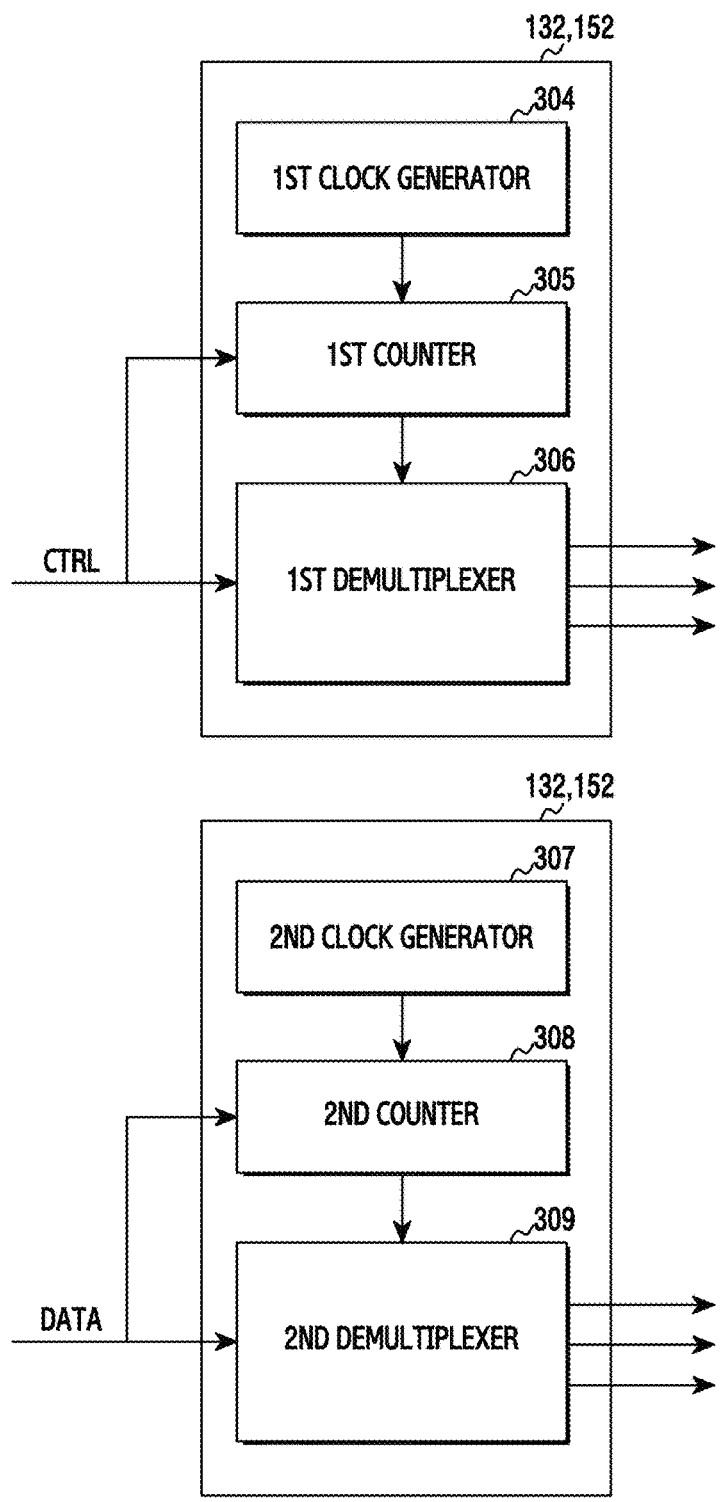
Figure 3C:
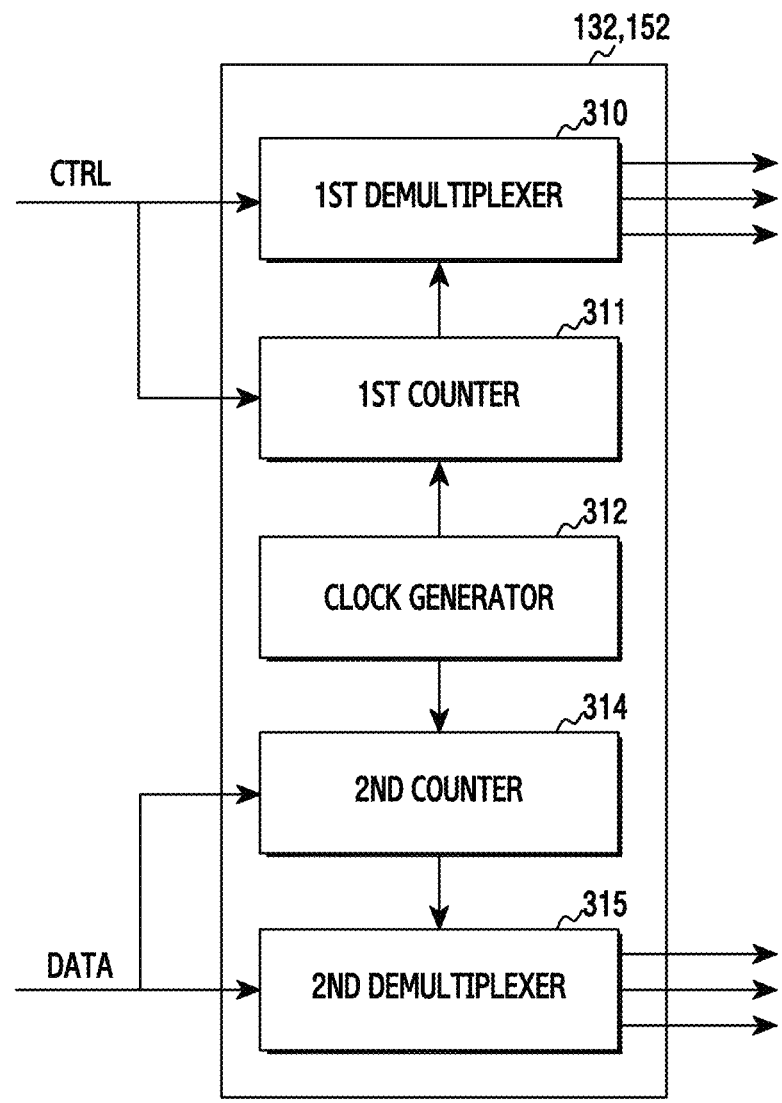

FIG. 3A to FIG. 3C are block diagrams illustrating reception interface units in a wireless communication device, according to embodiments of the present disclosure.

Referring to FIG. 3A, the reception interface unit 132, 152 includes a clock generator 300, a counter 302, and a demultiplexer 303.

The clock generator 300 generates a clock signal having a period that is shorter than a period of a clock signal used in the transmission interface unit 131, 151, and supplies the generated clock signal to the counter 302. For example, the clock generator 300 may generate a clock signal having a period shorter than periods of clock frequencies (f1, f2, . . . fn) used in the transmission interface unit 131, 151.

Based on a first clock signal from the clock generator 300, the counter 302 counts the first clock signal during a single bit duration included in a digital signal (e.g., a data signal or a control signal), and transmits the corresponding control signal to the demultiplexer 303 in accordance with the counting of the first clock signal. For example, as described in greater detail below with respect to FIG. 6, the counter 302 determines how many times the first clock signal from the clock generator 300 is generated during a single bit duration (e.g., a control bit such as a start bit) included in the digital signal (e.g., data signal or control signal). The counter 302 supplies a control signal indicating a corresponding output port to the demultiplexer 303 in accordance with a result of the determination. Specifically, the reception interface unit 152 determines whether a digital signal received through an input port is transmitted by a wireless communication unit among the plurality of wireless communication units 120-1 to 120-$n$ of FIG. 2. Alternatively, the reception interface unit 132 may determine whether a digital signal received through an input port is transmitted by a processor among the plurality of processors 160-1 to 160-$n$ of FIG. 2.

The demultiplexer 303 selects one of a plurality of output ports, and outputs a digital signal (e.g., a control signal or a data signal) in accordance with a control signal of the counter 302 indicating the corresponding output port. For example, when a data signal (data) or a control signal (ctrl)

from the first wireless communication unit 120-1 is received through an input port, the demultiplexer 303 outputs the data signal (data) or the control signal (ctrl) to a first output port corresponding to the first wireless communication unit 120-1. The input port is shown to have divided data and control signals, however, the input port may be implemented as a single input port in accordance with an embodiment of the present disclosure. Similarly, when a data signal (data) or a control signal (ctrl) from the $n^{th}$ wireless communication unit 120-$n$ is received through an input port, the demultiplexer 303 may output the data signal (data) or control signal (ctrl) through an $n^{th}$ output port corresponding to the $n^{th}$ wireless communication unit 120-$n$.

As shown in FIG. 3A, the demultiplexer 303 outputs the data signal (data) and the control signal (ctrl) and, as shown in FIG. 3B and FIG. 3C, one of two multiplexers ouptuts the data signal (data) and the other multiplexer may signal (ctrl).

Referring to FIG. 3B, the reception interface unit 132, 152 includes a first clock generator 304, a second clock generator 307, a first counter 305, and a second counter 308, a first demultiplexer 306, and a second demultiplexer 309.

The first clock generator 304 and the second clock generator 307 generate clock signals at a period that is shorter than a period of a clock signal used in the transmission interface unit 131, 151, and supply the generated clock signals to the counters 305 and 308. For instance, the first clock generator 304 generates a clock signal having a period that is shorter than those of clock frequencies (f1, f2, . . . fn) used in the transmission interface unit 131, 151, and supplies the generated clock signal to the first counter 305. The second clock generator 307 generates a clock signal having a period that is shorter than those of the clock frequencies (f1, f2, . . . fn) used in the transmission interface unit 131, 151, and supplies the generated clock signal to the second counter 308. The clock signal of the first clock generator 304 and the clock signal of the second clock generator 307 may be the same as or different from each other.

Based on a first clock signal from the first clock generator 304, the first counter 305 counts the first clock signal during a single bit duration included in a control signal, and transmits the corresponding control signal to the first demultiplexer 306 in accordance with a result of the counting. For example, as described in greater detail with respect to FIG. 6 below, the first counter 305 determines how many times the first clock signal from the first clock generator 304 is generated during a single bit duration (e.g., a control bit such as a start bit) included in the digital signal (e.g., control signal), and supplies a control signal indicating a corresponding output port to the demultiplexer 303 in accordance with the determination. Specifically, the reception interface unit 152 determines whether a digital signal that is received through an input port is transmitted by a wireless communication unit among the plurality of wireless communication units 120-1 to 120-$n$ of FIG. 2, based on a result of the counting. Alternatively, the reception interface unit 132 may determine whether a digital signal received through an input port is transmitted by a processor among the plurality of processors 160-1 to 160-$n$ of FIG. 2, based on a result of the counting.

The first demultiplexer 306 selects one of a plurality of output ports, and outputs a digital signal (e.g., a control signal) in accordance with a control signal of the first counter 305 indicating the corresponding output port. For example, when a control signal (ctrl) from the first wireless communication unit 120-1 is received through an input port, the first demultiplexer 306 outputs the control signal (ctrl) to a first output port corresponding to the first wireless communication unit 120-1. Similarly, when a control signal (ctrl) from the $n^{th}$ wireless communication unit 120-$n$ is received through an input port, the first demultiplexer 306 outputs the control signal (ctrl) through an $n^{th}$ output port corresponding to the $n^{th}$ wireless communication unit 120-$n$.

Based on a second clock signal from the second clock generator 307, the second counter 308 counts the second clock signal during a single bit duration included in a data signal, and transmits the corresponding control signal to the second demultiplexer 309, in accordance with a result of the counting. For example, as described in greater detail with respect to FIG. 6 below, the second counter 308 determines how many times the second clock signal from the second clock generator 307 is generated during a single bit duration (e.g., a control bit such as a start bit) included in the data signal, and supplies a control signal indicating a corresponding output port to the second demultiplexer 309 in accordance with a result of the determination. Specifically, the reception interface unit 152 determines whether a data signal that is received through an input port is transmitted by a wireless communication unit among the plurality of wireless communication units 120-1 to 120-$n$ of FIG. 2, based on the counting result. Alternatively, the reception interface unit 132 determines whether a data signal received through an input port is transmitted by a processor among the plurality of processors 160-1 to 160-$n$ of FIG. 2, based on a result of the counting.

The second demultiplexer 309 selects one of a plurality of output ports, and outputs a digital signal (e.g., a data signal) in accordance with a control signal of the second counter 308 indicating the corresponding output port. For example, when a data signal from the first wireless communication unit 120-1 is received through an input port, the second demultiplexer 309 outputs the data signal to a first output port corresponding to the first wireless communication unit 120-1. Similarly, when a data signal from the $n^{th}$ wireless communication unit 120-$n$ is received through an input port, the second demultiplexer 309 outputs the data signal through an $n^{th}$ output port corresponding to the $n^{th}$ wireless communication unit 120-$n$.

In FIG. 3B, the reception interface unit 132, 152 supplies the clock signals to the respective multiplexers through the individual clock generators. However, in FIG. 3C, the reception interface unit 132, 152 supplies clock signals to a plurality of multiplexers through one clock generator as well.

Referring to FIG. 3C, the reception interface unit 132, 152 includes a single clock generator 312, a first counter 311, a second counter 314, a first demultiplexer 310, and a second demultiplexer 315.

The clock generator 312 generates a clock signal having a period that is shorter than a period of a clock signal used in the transmission interface unit 131, 151, and supplies the generated clock signal to the first counter 311 and the second counter 314.

Based on a first clock signal from the clock generator 312, the first counter counts the first clock signal during a single bit duration included in a control signal, and transmits the corresponding control signal to the first demultiplexer 310 in accordance with a result of the counting. For example, as described in greater detail below with respect to FIG. 6, the first counter 311 determines how many times the clock signal from the clock generator 312 is generated during a single bit duration (e.g., a control bit such as a start bit) included in the digital signal (e.g., control signal), and supplies a control signal indicating a corresponding output port to the first demultiplexer 310 in accordance with a result of the determination. Specifically, the reception interface unit 152 determines whether a digital signal received through an input port is transmitted by a wireless communication unit among the plurality of wireless communication units 120-1 to 120-n of FIG. 2, based on a result of the counting. Alternatively, the reception interface unit 132 may determine whether a digital signal received through an input port is transmitted by a processor among the plurality of processors 160-1 to 160-n of FIG. 2, based a result of the counting.

The first demultiplexer 310 selects one of a plurality of output ports, and outputs a digital signal (e.g., a control signal) in accordance with a control signal of the first counter 311 indicating the corresponding output port. For example, when a control signal from the first wireless communication unit 120-1 is received through an input port, the first demultiplexer 310 outputs the control signal to a first output port corresponding to the first wireless communication unit 120-1. Similarly, when a control signal (ctrl) from the $n^{th}$ wireless communication unit 120-n is received through an input port, the first demultiplexer 310 outputs the control signal (ctrl) through an $n^{th}$ output port corresponding to the $n^{th}$ wireless communication unit 120-n.

Based on a second clock signal from the clock generator 312, the second counter 314 counts the second clock signal during a single bit duration included in a data signal, and transmits the corresponding control signal to the second demultiplexer 315 in accordance with a result of the counting. For example, as described in greater detail below with respect to FIG. 6, the second counter 308 determines how many times the clock signal from the clock generator 312 is generated during a single bit duration (e.g., a control bit such as a start bit) included in the data signal, and supplies a control signal indicating a corresponding output port to the second demultiplexer 315 in accordance with a result of the determination. Specifically, the reception interface unit 152 determines whether a data signal received through an input port is transmitted by a wireless communication unit among the plurality of wireless communication units 120-1 to 120-n of FIG. 2, based on a result of the counting. Alternatively, the reception interface unit 132 may determine whether a data signal received through an input port is transmitted by a processor among the plurality of processors 160-1 to 160-n of FIG. 2, based on a result of the counting.

The second demultiplexer 315 selects one of a plurality of output ports, and outputs a digital signal (e.g., a data signal) in accordance with a control signal of the second counter 308 indicating the corresponding output port. For example, when a data signal from the first wireless communication unit 120-1 is received through an input port, the second demultiplexer 315 outputs the data signal to a first output port corresponding to the first wireless communication unit 120-1. Similarly, when a data signal from the $n^{th}$ wireless communication unit 120-n is received through an input port, the second demultiplexer 315 outputs the data signal through an $n^{th}$ output port corresponding to the $n^{th}$ wireless communication unit 120-n.

The clock signals of the clock generators of FIGS. 2A to 2C and the clock signals of the clock generators of FIGS. 3A to 3C are operated independently. The clock signals of the clock generators of FIGS. 2A to 2C may not be provided to the reception interface unit 132, 152, or the clock signals of the clock generators of FIGS. 3A to 3C may not be provided to the transmission interface unit 131, 151.

Figure 4A:
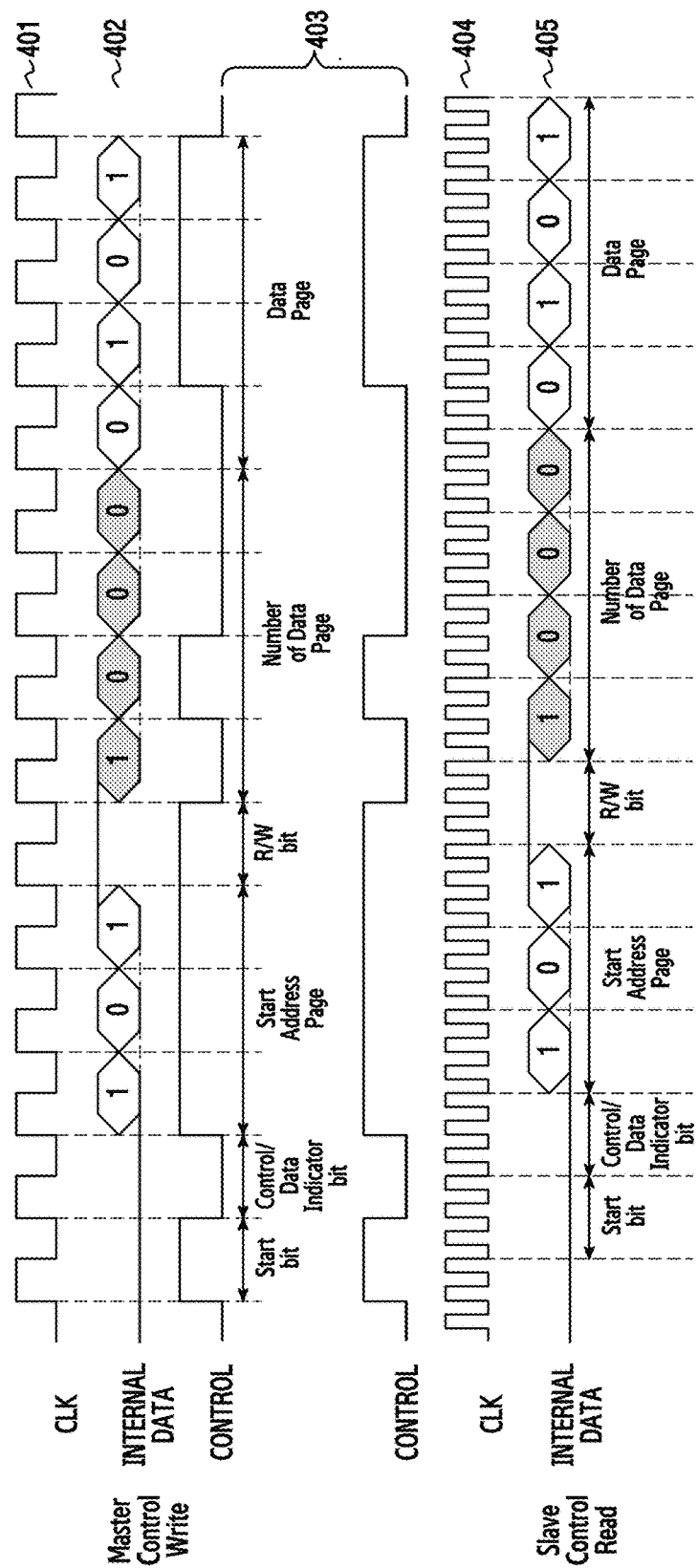
FIG. 4A and FIG. 4B are timing diagrams of digital signals based on a first wireless communication scheme, according to embodiments of the present disclosure.
Figure 4B:
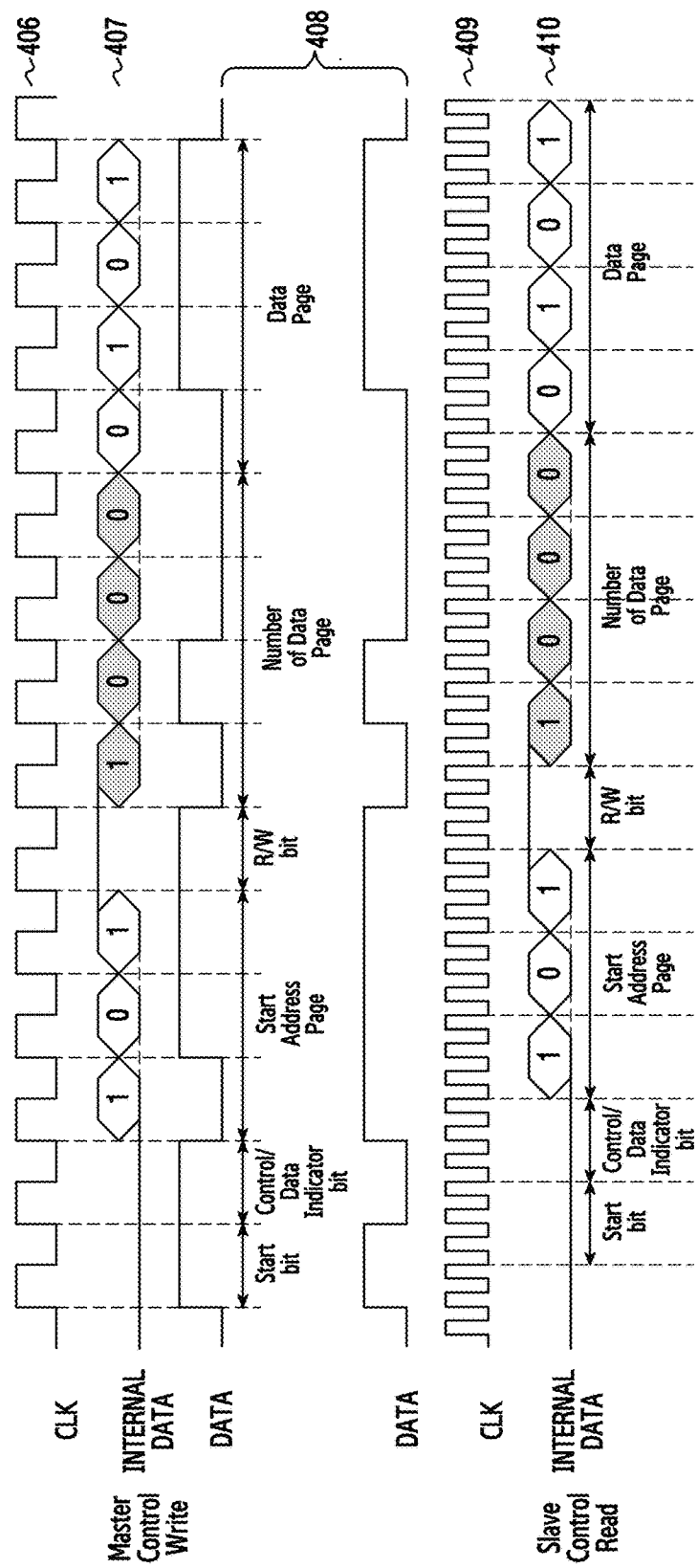

FIG. 4A and FIG. 4B are timing diagrams of digital signals based on a first wireless communication scheme, according to embodiments of the present disclosure.

FIG. 4A is a timing diagram for transmission of a control signal based on a clock signal used by a first wireless communication unit, according to an embodiment of the present disclosure.

A master denotes a subject (e.g., a wireless communication unit or a processor) for transmitting a digital signal, and a slave denotes a subject (e.g., a wireless communication unit or a processor) for receiving a digital signal. For example, if the wireless communication unit is a master, the processor may become a slave and, if the wireless communication unit is a slave, the processor may become a master.

"CLK" 401 denotes a clock signal used by a first wireless communication unit, "INTERNAL DATA" 402 denotes a digital control bit value (101, 10000101), and "CONTROL" 403 denotes a control signal corresponding to the "INTERNAL DATA" 402. Specifically, the "CONTROL" 403 includes a start bit and a control/data indicator bit, in front of a digital control bit stream of the "INTERNAL DATA" 402. The "CONTROL" 403 also includes a Read/Write (R/W) bit indicating read/write within the digital control bit stream of the "INTERNAL DATA" 402, for example, between a bit stream (101) corresponding to a start address page of the "INTERNAL DATA" 402 and a bit stream (1000) of number of data page of the "INTERNAL DATA" 402. The "CONTROL" 403 includes a data page (101) following the bit stream (1000) of the number of data page of the "INTERNAL DATA" 402.

When a previous bit and a current bit are changed (e.g., 0→1, 1→0), if the previous bit is equal to '0' and the current bit is equal to '1', or if the previous bit is equal to '1' and the current bit is equal to '0', the "CONTROL" 403 expresses the current bit as '1'. In contrast, when the previous bit and the current bit are not changed (e.g., 0→0, 1→1), if the previous bit is equal to '1' and the current bit is equal to 1', or if the previous bit is equal to '0' and the current bit is equal to '0', the "CONTROL" 403 expresses the current bit as '0'. For example, the bit stream (101) corresponding to the start address page of the "INTERNAL DATA" 402 is expressed as '111' in the "CONTROL" 403, and the bit stream (Ser. No. 10000101) of the number of data page and the data page of the "INTERNAL DATA" 402 is expressed as '01000111' in the "CONTROL" 403.

According to another embodiment of the present disclosure, when a previous bit and a current bit are changed (e.g., 0→1, 1→0), if the previous bit is equal to '0' and the current bit is equal to '1', or if the previous bit is equal to '1' and the current bit is equal to '0', the "CONTROL" 403 expresses the current bit as '0'. In contrast, when the previous bit and the current bit are not changed (e.g., 0→0, 1→1), if the previous bit is equal to '1' and the current bit is equal to '1' or if the previous bit is equal to '0' and the current bit is equal to '0', the "CONTROL" 403 expresses the current bit as '1'.

In other embodiments of the present disclosure, irrespective of values of a previous bit and a current bit, if a bit is equal to '1', the "CONTROL" expresses the bit as '1' and, if the bit is equal to '0', the "CONTROL" expresses the bit as '0'. For example, if the bit stream of the "INTERNAL DATA" 402 is equal to '101', the bit stream is expressed as '101' in the "CONTROL" 403.

If a digital signal corresponding to the "CONTROL" 403, i.e., a control signal of a master, is forwarded to a slave, the slave receives the "CONTROL" 403, based on a clock signal 404, which is faster than the clock signal 401 of the master.

Because the clock signal 404 of the slave has a shorter period than the clock signal 401 of the master, one or more clocks of the slave may appear during a bit duration corresponding to a single clock period of the master. For example, three clocks of the slave may appear during a start bit duration of the slave.

The slave determines a wireless communication unit to which a control signal is to be transmitted or a wireless communication unit to which a control signal is to be forwarded, in accordance with the number of times a clock signal is generated in the slave during the bit duration corresponding to a single clock period of the master.

The slave determines each bit of the "CONTROL" 403 based on a middle point of the bit duration. However, embodiments of the present disclosure are not limited to recognizing a bit value of the "CONTROL" 403 based on the middle point of the bit duration, and may determine the bit value of the "CONTROL" 403 based on other methods.

FIG. 4B is a timing diagram illustrating transmission of a data signal based on a clock signal used by a first wireless communication unit, according to an embodiment of the present disclosure.

"CLK" 406 and "INTERNAL DATA" 407 of FIG. 4B are the same as the "CLK" 401 and the "INTERNAL DATA" 402 of FIG. 4A. However, FIG. 4A and FIG. 4B differ in a control/data indicator bit indicating control/data. For example, the control/data indicator bit of FIG. 4A is a bit value indicating control, and the control/data indicator bit of FIG. 4B is a bit value indicating data.

If a digital signal corresponding to "DATA" 408, i.e., a data signal of a master, is forwarded to a slave, the slave receives the "DATA" 408, based on a clock signal 409, that is faster than the clock signal 406 of the master.

Because the clock signal 409 of the slave has a shorter period than the clock signal 406 of the master, a clock signal of the slave may be generated one or more times during a bit duration corresponding to one clock period of the master. For example, a clock signal of the slave may be generated three times during a start bit duration of the slave.

The slave determines a wireless communication unit from which to transmit a data signal or a wireless communication unit to which to forward a data signal, in accordance with the number of times a clock signal used in the slave is generated during the bit duration corresponding to a single clock period of the master.

The slave determines each bit of the "DATA" 408 based on a middle point of the bit duration. However, embodiments of the present disclosure are not limited to recognizing a bit value of the "DATA" 408 based on the middle point of the bit duration, and the bit value of the "DATA" 408 may be determined based on other methods.

Figure 5A:
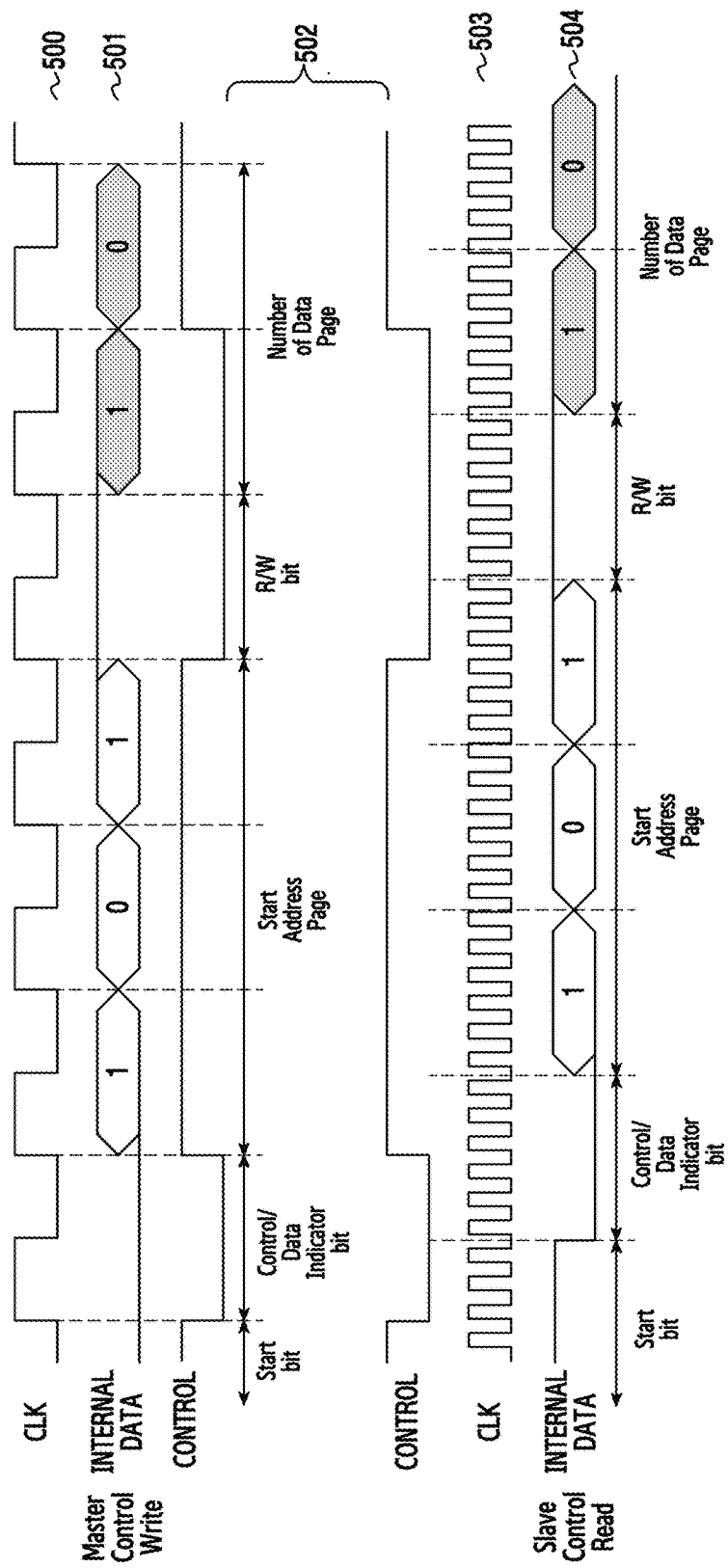
FIG. 5A and FIG. 5B are timing diagrams of digital signals based on a second wireless communication scheme, according to embodiments of the present disclosure.
Figure 5B:
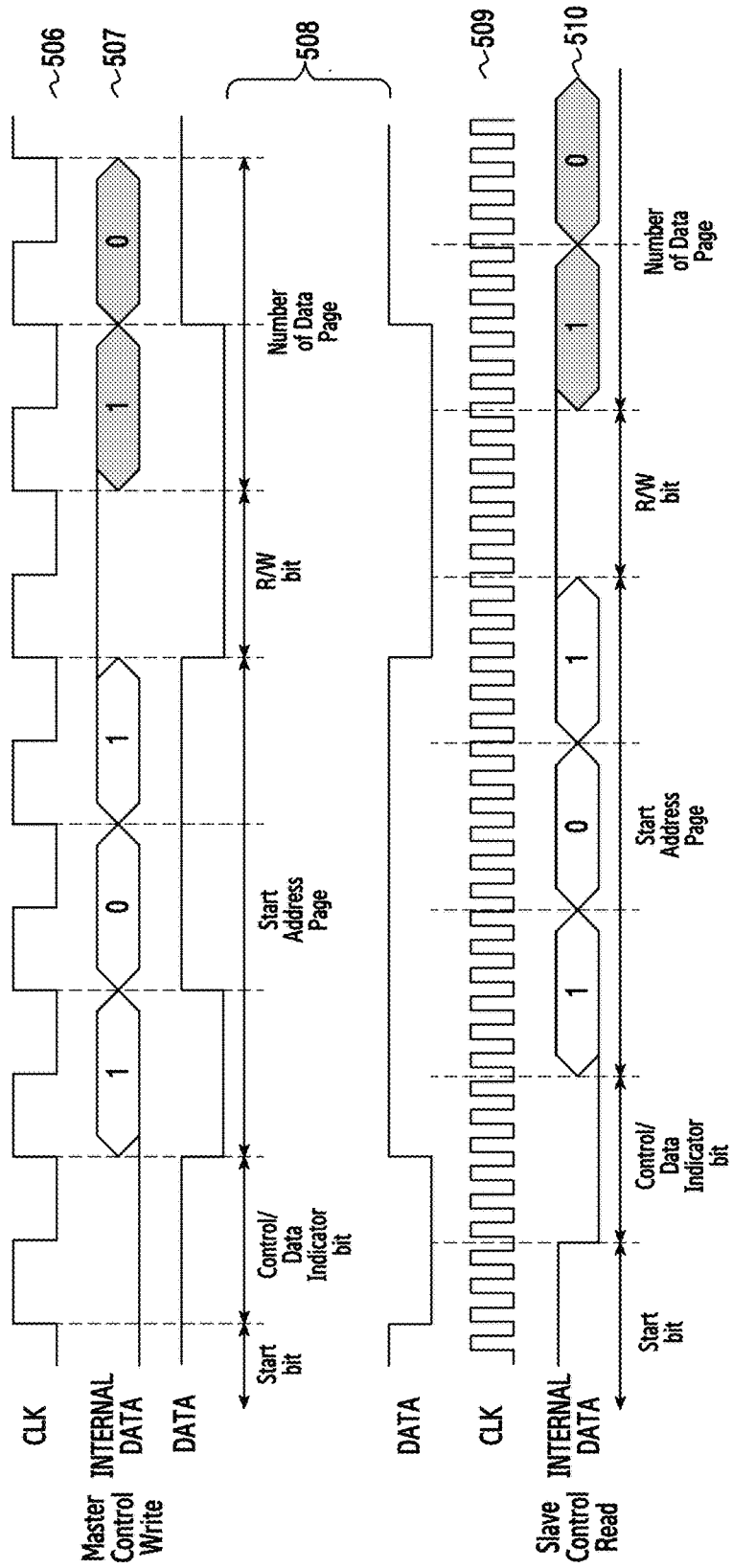

FIG. 5A and FIG. 5B are timing diagrams illustrating digital signals based on a second wireless communication scheme, according to embodiments of the present disclosure.

FIG. 5A is a timing diagram for transmission of a control signal based on a clock signal used by a second wireless communication unit, according to an embodiment of the present disclosure.

"CLK" 500 denotes a clock signal used by a second wireless communication unit, "INTERNAL DATA" 501 denotes a digital control bit value (101, 10), and "CONTROL" 502 denotes a control signal corresponding to the "INTERNAL DATA" 501. Specifically, the "CONTROL" 502 includes a start bit and a control/data indicator bit, in front of a digital control bit stream of the "INTERNAL DATA" 501. The "CONTROL" 502 also includes an R/W bit within the digital control bit stream of the "INTERNAL DATA" 501, for example, between a bit stream (101) corresponding to a start address page of the "INTERNAL DATA" 501 and a bit stream (10) of number of data page of the "INTERNAL DATA" 501. The "CONTROL" 502 includes a data page following the bit stream (10) of the number of the data page of the "INTERNAL DATA" 501.

The clock signal 500 used by the second wireless communication unit has a longer period than the clock signal 401 used by the first wireless communication unit.

When a previous bit and a current bit are changed (e.g., 0→1, 1→0), if the previous bit is equal to '0' and the current bit is equal to '1', or if the previous bit is equal to '1' and the current bit is equal to '0', the "CONTROL" 502 expresses the current bit as '1'. In contrast, when the previous bit and the current bit are not changed (e.g., 0→0, 1→1), if the previous bit is equal to '1' and the current bit is equal to '1', or if the previous bit is equal to '0' and the current bit is equal to '0', the "CONTROL" 502 expresses the current bit as '0'. For example, the bit stream (101) corresponding to the start address page of the "INTERNAL DATA" 501 is expressed as '111' in the "CONTROL" 502, and the bit stream (10) of the number of data page of the "INTERNAL DATA" 501 is expressed as '01' in the "CONTROL" 502.

According to another embodiment of the present disclosure, when a previous bit and a current bit are changed (e.g., 0→1, 1→0), if the previous bit is equal to '0' and the current bit is equal to '1', or if the previous bit is equal to '1' and the current bit is equal to '0', the "CONTROL" 502 expresses the current bit as '0'. In contrast, when the previous bit and the current bit are not changed (e.g., 0→0, 1→1), if the previous bit is equal to '1' and the current bit is equal to '1', or if the previous bit is equal to '0' and the current bit is equal to '0', the "CONTROL" 502 expresses the current bit as '1'.

In other embodiments of the present disclosure, irrespective of values of a previous bit and a current bit, if a bit is equal to '1', the "CONTROL" 502 expresses the bit as '1' and, if the bit is equal to '0', the "CONTROL" 502 expresses the bit as '0'. For example, if the bit stream of the "INTERNAL DATA" 501 is equal to '101', the bit stream may be expressed as '101' in the "CONTROL" 502.

If a digital signal corresponding to the "CONTROL" 502, i.e., a control signal of a master, is forwarded to a slave, the slave receives the "CONTROL" 502, based on a clock signal 503 that is faster than the clock signal 500 of the master.

Because the clock signal 503 of the slave has a shorter period than the clock signal 500 of the master, the clock signal of the slave may be generated one or more times during a bit duration corresponding to one clock period of the master. For example, the clock signal of the slave may be generated six times during a start bit duration of the slave.

The slave determines which wireless communication unit from which a control signal is to be transmitted, or a wireless communication unit to which a control signal is to be forwarded, in accordance with the number of times the clock signal used in the slave is generated during the bit duration corresponding to a single clock period of the master.

The slave determines each bit of the "CONTROL" 502 based on a middle point of the bit duration. However, embodiments of the present disclosure are not limited to recognizing a bit value of the "CONTROL" 502 based on the middle point of the bit duration, and may determine the bit value of the "CONTROL" 502 based on other methods.

FIG. 5B is a timing diagram for transmission of a data signal based on a clock signal used by a second wireless communication unit, according to an embodiment of the present disclosure.

"CLK" 506 and "INTERNAL DATA" 507 of FIG. 5B are the same as the "CLK" 500 and the "INTERNAL DATA"

501 of FIG. 5A. However, FIG. 5A and FIG. 5B differ in a control/data indicator bit indicating control/data. For example, the control/data indicator bit of FIG. 5A is a bit value indicating control and the control/data indicator bit of FIG. 5B is a bit value indicating data.

As in FIG. 5A, if a digital signal corresponding to "DATA" 508, i.e., a data signal of a master, is forwarded to a slave, the slave receives the "DATA" 508, based on a clock signal 509 that is faster than the clock signal 506 of the master.

Because the clock signal 509 of the slave has a shorter period than the clock signal 506 of the master, the clock signal of the slave may be generated one or more times during a bit duration corresponding to one clock period of the master. For example, the clock signal of the slave may be generated six times during a start bit duration of the slave.

The slave determines a wireless communication unit from which a data signal is to be transmitted, or a wireless communication unit to which a data signal is to be forwarded, in accordance with the number of times the clock signal is generated in the slave during the bit duration corresponding to a single clock period of the master.

The slave determines each bit of the "DATA" 508 based on a middle point of the bit duration. However, embodiments of the present disclosure are not limited to recognizing a bit value of the "DATA" 508 based on the middle point of the bit duration, and may determine the bit value of the "DATA" 508 based on other methods.

Figure 6A:
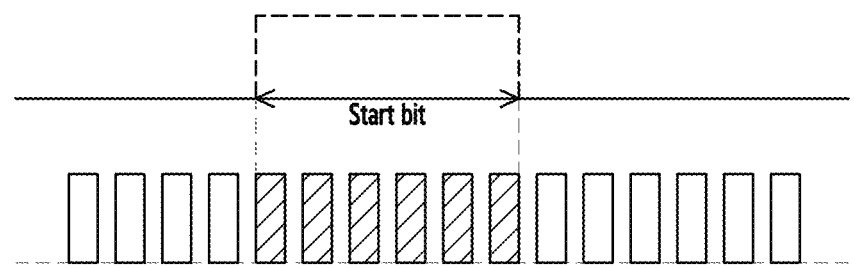
FIG. 6A to FIG. 6C are diagrams illustrating the counting of the number of clocks during various bit durations, according to embodiments of the present disclosure.
Figure 6B:
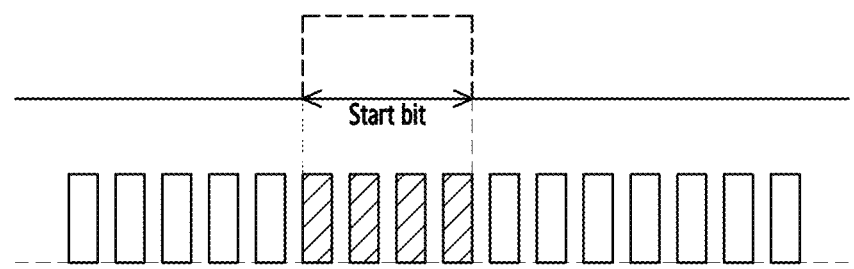
Figure 6C:
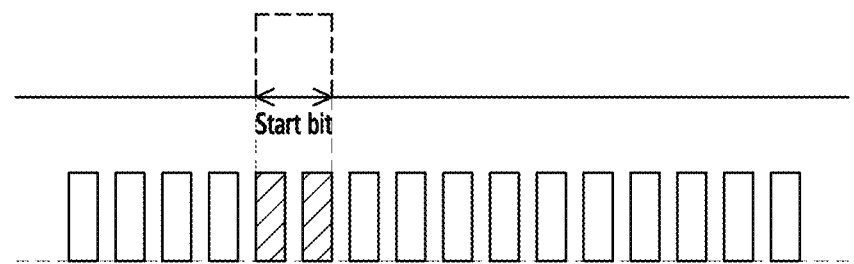

FIG. 6A to 6C are diagrams illustrating counting of the number of times the clock signal is generated during various bit durations, according to embodiments of the present disclosure.

FIG. 6A illustrates counting a number of times the clock signal of a slave is generated during a start bit duration synchronized to a first clock. FIG. 6B illustrates counting a number of times a clock signal of the slave is generated during a start bit duration synchronized to a second clock. FIG. 6C illustrates counting of the number of time the clock signal of the slave is generated during a start bit duration synchronized to a third clock. The first clock is used in a first wireless communication unit, the second clock is used in a second wireless communication unit, and the third clock is used in a third wireless communication unit. The second clock has a shorter clock period than the third clock, and the first clock has a shorter clock period than the second clock. The clock of the slave has a shorter clock period than the first clock, the second clock, and the third clock.

For example, in FIG. 6A, six clock generations of the slave are counted during the start bit duration synchronized to the first clock, In FIG. 6B, four clock generations of the slave are counted during the start bit duration synchronized to the second clock. In FIG. 6C, two clock generations of the slave are counted during the start bit duration synchronized to the third clock.

Therefore, the slave determines a wireless communication unit from which a corresponding digital signal is provided, in accordance with the number of times clock generation is counted during the start bit duration. The slave also determines a wireless communication unit to which a corresponding digital signal is to be provided, in accordance with the number of times generation of the clock is counted during the start bit duration.

Embodiments of the present disclosure related to counting the number of clock generations are not limited to those presented in FIGS. 6A to 6C

Figure 7:
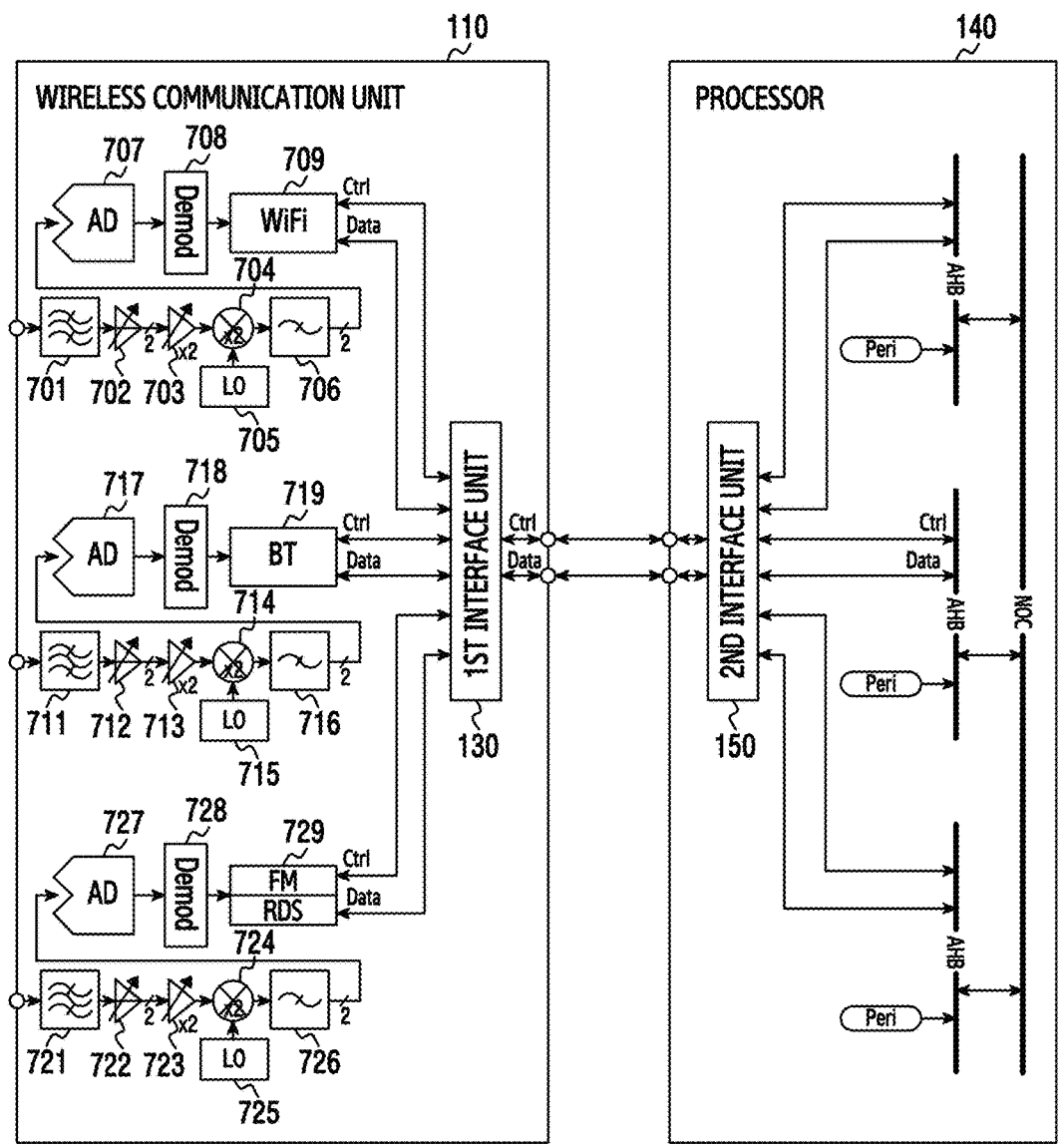
FIG. 7 is a block diagram illustrating a wireless communication device, according to an embodiment of the present disclosure.

FIG. 7 is a block diagram illustrating a wireless communication device, according to an embodiment of the present disclosure.

Referring to FIG. 7, the wireless communication device includes a plurality of wireless communication units 110 and a plurality of processors 140. The wireless communication device may further include a memory, a microphone, a speaker, and a display. For description convenience, a wireless communication device including three wireless communication units is described as an example, but the wireless communication device may include any number of wireless communication units.

The wireless communication unit includes a first communication unit of a WiFi communication scheme, a second communication unit of a Bluetooth communication scheme, and a third communication unit receiving an FM radio signal.

To perform a reception function, the first communication unit includes a band select filter 701, a low noise amplifier (LNA) 702, a signal amplifier 703, a mixer 704, a local oscillator (LO) 705, a channel select filter 706, an analog to digital (A/D) converter 707, a demodulator 708, and a WiFi communication modem 709.

The band select filter 701 performs band-pass filtering of an RF signal received through an antenna. Specifically, the band select filter 701 amplifies only a desired frequency band. Also, when using many channels, the band select filter may pass in-band channels. When using the same antenna, a duplexer may perform the role of the band select filter.

The LNA 702 amplifies a reception signal including a noise while maximally suppressing the amplification of the noise of the reception signal.

The signal amplifier 703 amplifies the signal whose noise is eliminated by the LNA 702 and outputs the amplified signal to the mixer 704.

In various embodiments of the present disclosure, in place of the signal amplifier 703, an image reject filter may be coupled between the LNA 702 and the mixer 704.

To prevent an image frequency among the signal amplified in the LNA 702 from being forwarded to the mixer 704, the image reject filter may perform the band-pass filtering once again. The image reject filter may additionally reject spurious components.

The mixer 704, which is embodied as a down-conversion mixer, down converts a frequency of a low-noise amplified RF signal, into an Intermediate Frequency (IF) band or baseband.

The LO 705 supplies a local frequency for frequency synthesis to the mixer 704. In case of communication needing channel selection, the LO 705 may change the local frequency and perform channel selection.

A phase locked loop (PLL) may lock an output frequency of the LO 705, such that the output frequency may be fixed to a certain frequency, without frequency drift. Also, the PLL may adjust a voltage of a voltage-controlled oscillator (VCO) that is used as the LO 705 through control input, and shift and fix the output frequency of the LO 705 to a desired frequency.

The channel select filter 706 performs a function of band-pass filtering and selects only a desired channel in a signal including many channels converted into an IF band or baseband frequency.

The A/D converter 707 converts an analog signal from the channel select filter 706 into a digital signal, and outputs the digital signal to the demodulator 708.

The demodulator 708 demodulates the digital signal correspondingly to a corresponding modulation scheme of a transmitter.

The WiFi communication modem 709 forwards the demodulated signal of the demodulator 708, to the processor 140, based on a WiFi communication scheme.

The first communication unit may further include a Digital to Analog (D/A) converter, a modulator, an up-conversion mixer, and an amplifier. The D/A converter converts a digital signal from the WiFi communication modem 709, into an analog signal based on a corresponding modulation scheme. The modulator modulates the analog signal based on the corresponding modulation scheme. The up-conversion mixer converts the modulated signal into an RF signal. The amplifier amplifies the RF signal.

To perform a reception function, the second communication unit includes a band select filter 711, a LNA 712, a signal amplifier 713, a mixer 714, a LO 715, a channel select filter 716, an A/D converter 717, a demodulator 718, and a Bluetooth communication modem 719.

The band select filter 711, LNA 712, signal amplifier 713, mixer 714, LO 715, channel select filter 716, A/D converter 717, and demodulator 718 of the second communication unit perform the same functions as the band select filter 701, LNA 702, signal amplifier 703, mixer 704, LO 705, channel select filter 706, A/D converter 707, and demodulator 708 of the first communication unit.

The Bluetooth communication modem 719 forwards a demodulated signal from the demodulator 718, to the processor 140, based on a Bluetooth communication scheme.

The second communication unit may further include a D/A converter, a modulator, an up-conversion mixer, and an amplifier. The D/A converter converts a digital signal from the Bluetooth communication modem 719, into an analog signal based on a corresponding modulation scheme. The modulator modulates the analog signal based on the corresponding modulation scheme. The up-conversion mixer converts the modulated signal into an RF signal. The amplifier amplifies the RF signal.

To perform a reception function, the third communication unit includes a band select filter 721, a LNA 722, a signal amplifier 723, a mixer 724, a LO 725, a channel select filter 726, an A/D converter 727, a demodulator 728, and an FM radio reception modem 729.

The band select filter 721, LNA 722, signal amplifier 723, mixer 724, LO 725, channel select filter 726, A/D converter 727, and demodulator 728 of the third communication unit perform the same functions as the band select filter 701, LNA 702 (703→702), signal amplifier 703, mixer 704, LO 705, channel select filter 706, A/D converter 707, and demodulator 708 of the first communication unit.

The FM radio reception modem 729 forwards a demodulated signal from the demodulator 728, to the processor 140, based on an FM communication scheme.

A common output interface is constructed between the first interface unit 130 and the second interface unit 150. For example, the first interface unit 130 and the second interface unit 150 each may include a multiplexer and a demultiplexer. The multiplexer may select and output one of a plurality of inputs, and the demultiplexer may select one of a plurality of outputs and provide one input. Accordingly, to connect the plurality of wireless communication units, one common interface, not a plurality of interfaces, for a data signal or control signal may be used between the first interface unit 130 and the second interface unit 150.

The first interface unit 130 synchronizes a digital signal (i.e., a control signal or data signal) from the wireless communication unit 110, to a clock of the wireless communication unit 110, and outputs the synchronized signal to the second interface unit 150 of the processor 140.

Also, the first interface unit 130 receives a digital signal (i.e., a control signal or data signal) from the processor 140, counts the number of clock generations during one bit duration of the digital signal, and outputs the digital signal to the corresponding wireless communication unit 110 based on the counted number of clock generations.

The second interface unit 150 synchronizes a digital signal (i.e., a control signal or data signal) from the processor 140, to a clock of the wireless communication unit 110, and outputs the synchronized signal to the first interface unit 130 of the wireless communication unit 110.

The second interface unit 150 receives a digital signal (i.e., a control signal or data signal) from the wireless communication unit 110, and counts the number of clock generations during one bit duration of the digital signal, and outputs the digital signal to the corresponding processor 140 based on the counted number of clock generations.

The processor 140 includes a plurality of data buses (e.g., Advanced high-performance buses (AHB) data buses), and forwards a digital signal corresponding to a corresponding communication scheme through the corresponding data bus.

Figure 8:
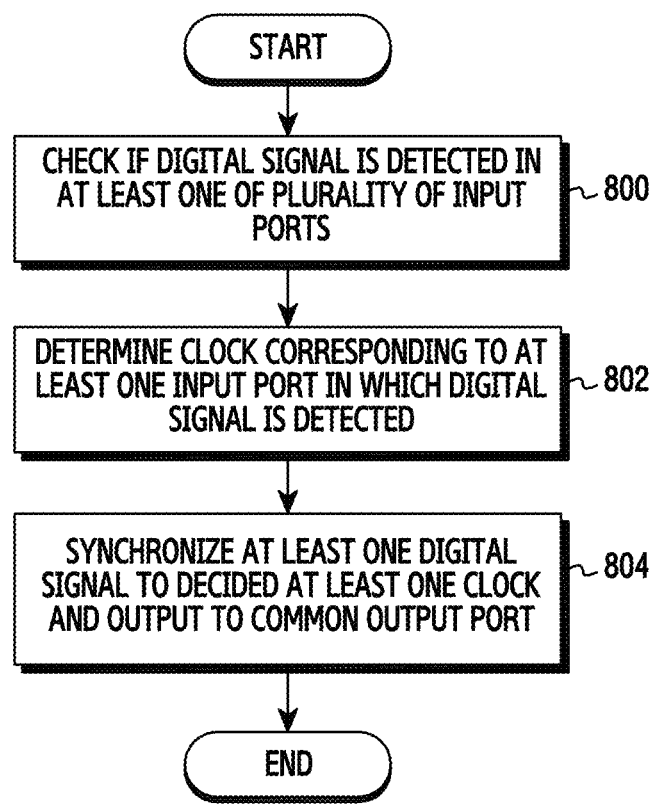
FIG. 8 is an operation flowchart of a first interface unit, according to an embodiment of the present disclosure.

FIG. 8 is an operation flowchart of a first interface unit, according to an embodiment of the present disclosure.

Referring to FIG. 8, in step 800, the first interface unit 130 determines whether a digital signal (e.g., a data signal or a control signal) is detected in at least one of a plurality of input ports. For example, as in FIG. 7, if a signal is detected through a first input port, the first interface unit 130 determines that the signal is introduced from a first communication unit (e.g., a WiFi communication modem) and, if a signal is detected through a second input port, the first interface unit 130 determines that the signal is introduced from a second communication unit (e.g., a Bluetooth communication modem) and, if a signal is detected through a third input port, the first interface unit 130 determines that the signal is introduced from a third communication unit (e.g., an FM radio reception modem).

In step 802, the first interface unit 130 determines a clock corresponding to the at least one input port in which the digital signal is detected. For example, if the signal is detected through the first input port, the first interface unit 130 selects a first clock used in the first communication unit. If the signal is detected through the second input port, the first interface unit 130 selects a second clock used in the second communication unit. If the signal is detected through the third input port, the first interface unit 130 selects a third clock used in the third communication unit. The third clock has a shorter period than the second clock, and the second clock has a shorter period than the first clock.

In step 804, the first interface unit 130 synchronizes the at least one digital signal to the determined clock, and outputs the synchronized signal to the second interface unit 150. For example, the signal from the first input port is outputted in synchronization with the first clock. The signal from the second input port is outputted in synchronization with the second clock. The signal from the third input port is outputted in synchronization with the third clock. For example, as shown and described with respect to FIG. 4A, the control signal 403 is outputted in synchronization with the clock signal 401 of the first communication unit. As shown and described with respect to FIG. 4B, the data signal 408 is outputted in synchronization with the clock signal 406 of the first communication unit. As shown and described with respect to FIG. 5A, the control signal 502 is outputted in synchronization with the clock signal 500 of the second communication unit. As shown and described with respect to FIG. 5B, the data signal 508 is outputted in synchronization with the clock signal 506 of the second communication unit.

Figure 9:
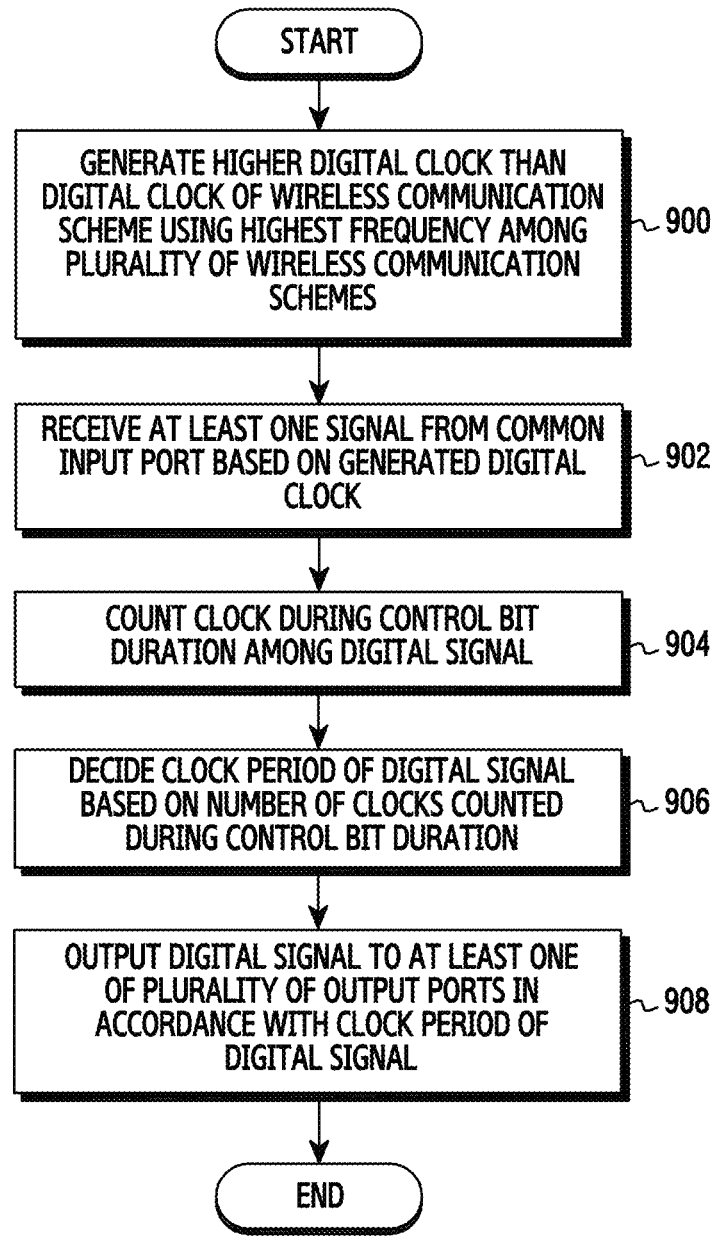
FIG. 9 is an operation flowchart of a second interface unit, according to an embodiment of the present disclosure.

FIG. 9 is an operation flowchart of a second interface unit, according an embodiment of the present disclosure.

Referring to FIG. 9, in step 900, the second interface unit 150 generates a digital clock that is higher than a digital clock of a wireless communication scheme that uses the highest frequency among a plurality of wireless communication schemes. For example, the second interface unit 150 generates a digital clock having a period that is shorter than the periods of the clocks used in a first communication unit, a second communication unit, and a third communication unit.

In step 902, the second interface unit 150 receives at least one digital signal from a common input port, based on the generated digital clock. For example, as shown and described with respect to FIG. 4A, the second interface unit 150 receives the control signal 403 based on a clock period 404 that is shorter than a clock period used in the second interface unit 150 or, as shown and described with respect to FIG. 4B, the second interface unit 150 receives the data signal 408 based on a clock period 409 that is shorter than a clock period used in the second interface unit 150.

In step 904, the second interface unit 150 counts a clock during a control bit (e.g., start bit) duration among the received digital signal.

In step 906, the second interface unit 150 determines a period of the digital signal, based on the number of clock generations counted during the control bit duration.

For example, as shown and described with respect to in FIG. 6A to 6C, the second interface unit 150 determines how many clock generations are counted during the start bit duration. For example, as in FIG. 6A, if six clock generations are counted during the start bit duration, the second interface unit 150 determines the digital signal to be a digital signal of the first communication unit. As shown and described with respect to FIG. 6B, if four clock generations are counted during the start bit duration, the second interface unit 150 determines the digital signal to be a digital signal of the second communication unit. As shown and described with respect to FIG. 6C, if two clock generations are counted during the start bit duration, the second interface unit 150 determines the digital signal to be a digital signal of the third communication unit.

In step 908, the second interface unit 150 outputs the digital signal to at least one of a plurality of output ports in accordance with a clock period of the digital signal. For example, if the digital signal is determined to be the digital signal of the third communication unit, the second interface unit 150 outputs the digital signal to a third data bus of a processor processing the digital signal of the third communication unit. If the digital signal is determined to be the digital signal of the second communication unit, the second interface unit 150 outputs the digital signal to a second data bus of a processor processing the digital signal of the second communication unit. If the digital signal is determined to be the digital signal of the first communication unit, the second interface unit 150 outputs the digital signal to a first data bus of a processor processing the digital signal of the first communication unit.

In embodiments of the present disclosure, in FIG. 7, some constituent elements (i.e., the A/D converter, the modulator, and the WiFi communication modem) of the first communication unit may be included in the processor, and some constituent elements (i.e., the Bluetooth communication modem) of the second communication unit may be included in the processor.

Figure 10:
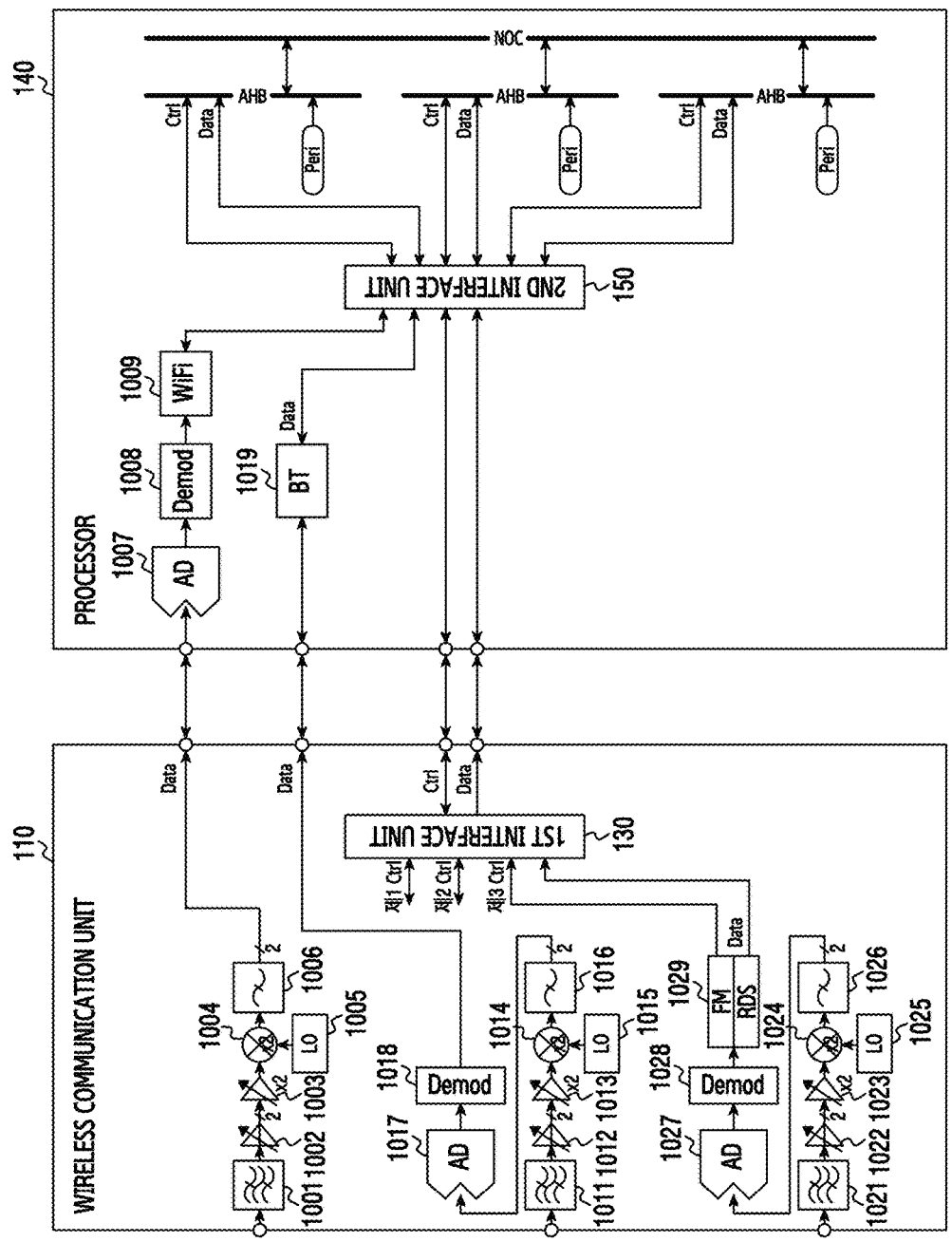
FIG. 10 is a block diagram illustrating a wireless communication device, according to an embodiment of the present disclosure.

FIG. 10 is a block diagram illustrating a wireless communication device, according to an embodiment of the present disclosure.

Referring to FIG. 10, the wireless communication device includes a plurality of wireless communication units 110 and a plurality of processors 140. The wireless communication device may further include a memory, a microphone, a speaker, and a display. A wireless communication device including three wireless communication units is described as an example, but the wireless communication device may include any number of wireless communication units.

The wireless communication unit includes a first communication unit of a WiFi communication scheme, a second communication unit of a Bluetooth communication scheme, and a third communication unit receiving an FM radio signal.

To perform a reception function, the first communication unit includes a band select filter 1001, a LNA 1002, a signal amplifier 1003, a mixer 1004, a LO 1005, a channel select filter 1006, an A/D converter 1007, a demodulator 1008, and a WiFi communication modem 1009. Some constituent elements (i.e., the AD converter 1007, the demodulator 1008, and the WiFi communication modem 1009) may be included in the processor 140.

The band select filter 1001, LNA 1002, signal amplifier 1003, mixer 1004, LO 1005, channel select filter 1006, A/D converter 1007, demodulator 1008, and WiFi communication modem 1009 of FIG. 10 may perform the same functions as the band select filter 701, LNA 702, signal amplifier 703, mixer 704, LO 705, channel select filter 706, A/D converter 707, demodulator 708 and WiFi communication modem 709 of FIG. 7.

To perform a reception function, the second communication unit includes a band select filter 1011, an LNA 1012, a signal amplifier 1013, a mixer 1014, an LO 1015, a channel select filter 1016, an A/D converter 1017, a demodulator 1018, and a Bluetooth communication modem 1019. Some constituent elements (i.e., the Bluetooth communication modem 1019) may be included in the processor 140.

The band select filter 1011, LNA 1012, signal amplifier 1013, mixer 1014, LO 1015, channel select filter 1016, A/D converter 1017, demodulator 1018, and Bluetooth communication modem 1019 of FIG. 10 may perform the same functions as the band select filter 711, LNA 712, signal amplifier 713, mixer 714, LO 715, channel select filter 716, A/D converter 717, demodulator 718 and Bluetooth communication modem 719 of FIG. 7.

To perform a reception function, the third communication unit includes a band select filter 1021, a LNA 1022, a signal amplifier 1023, a mixer 1024, a LO 1025, a channel select filter 1026, an A/D converter 1027, a demodulator 1028, and an FM radio reception modem 1029.

The band select filter 1021, LNA 1022, signal amplifier 1023, mixer 1024, LO 1025, channel select filter 1026, A/D converter 1027, demodulator 1028, and FM radio reception modem 1029 of FIG. 10 may perform the same functions as the band select filter 721, LNA 722, signal amplifier 723, mixer 724, LO 725, channel select filter 726, A/D converter 727, demodulator 728, and FM radio reception modem 729 of FIG. 7.

According to an embodiment of the present disclosure, a common output interface is constructed between the first interface unit 130 and the second interface unit 150. For example, the first interface unit 130 and the second interface unit 150 each include a multiplexer and a demultiplexer. The multiplexer may select and output one of a plurality of inputs, and the demultiplexer may select one of a plurality of outputs and provide one input. Accordingly, to connect the plurality of wireless communication units, one common interface, not a plurality of interfaces, for a data signal or control signal may be used between the first interface unit 130 and the second interface unit 150.

The first interface unit 130 synchronizes a control signal from the wireless communication unit 110, to a clock of the wireless communication unit 110, and outputs the synchronized signal to the second interface unit 150 of the processor 140.

The first interface unit 130 receives a control signal from the processor 140, counts the number of clock generations during a single bit duration of the control signal, and outputs the control signal to the corresponding wireless communication unit 110 based on the counted number of clock generations.

The second interface unit 150 synchronizes a control signal from the processor 140, to a clock of the wireless communication unit 110, and outputs the synchronized signal to the first interface unit 130 of the wireless communication unit 110.

The second interface unit 150 receives a control signal from the wireless communication unit 110, counts the number of clock generations during a single bit duration of the control signal, and outputs the control signal to the corresponding processor 140 based on the counted number of clock generations.

The processor 140 includes a plurality of data buses (e.g., AHB data buses), and forwards a control signal corresponding to a communication scheme through the corresponding data bus.

Because some constituent elements (i.e., the A/D converter 1007, the demodulator 1008, and the WiFi communication modem 1009) of the first communication unit are included in the processor 140, a separate interface is required to provide data from the first communication unit to the processor 140 or provide data from the processor 140 to the first communication unit.

Similarly, because some constituent elements (i.e., the Bluetooth communication modem 1019) of the second communication unit are included in the processor 140, a separate interface is required to provide data from the second communication unit to the processor 140 or provide data from the processor 140 to the second communication unit.

Specifically, control signals of the first communication unit, the second communication unit, and the third communication unit are provided to the processor 140 through the first interface unit 130, and a data signal of the third communication unit is provided through the first interface unit 130.

However, data signals of the first communication unit and the second communication unit are provided to the processor 140 through the separate respective interfaces.

Control signals for the first communication unit, the second communication unit, and the third communication unit are provided to the wireless communication unit 110 through the second interface unit 150. Data signals for the first communication unit and the second communication unit are provided to the wireless communication unit 110 through the separate respective interfaces.

Figure 11:
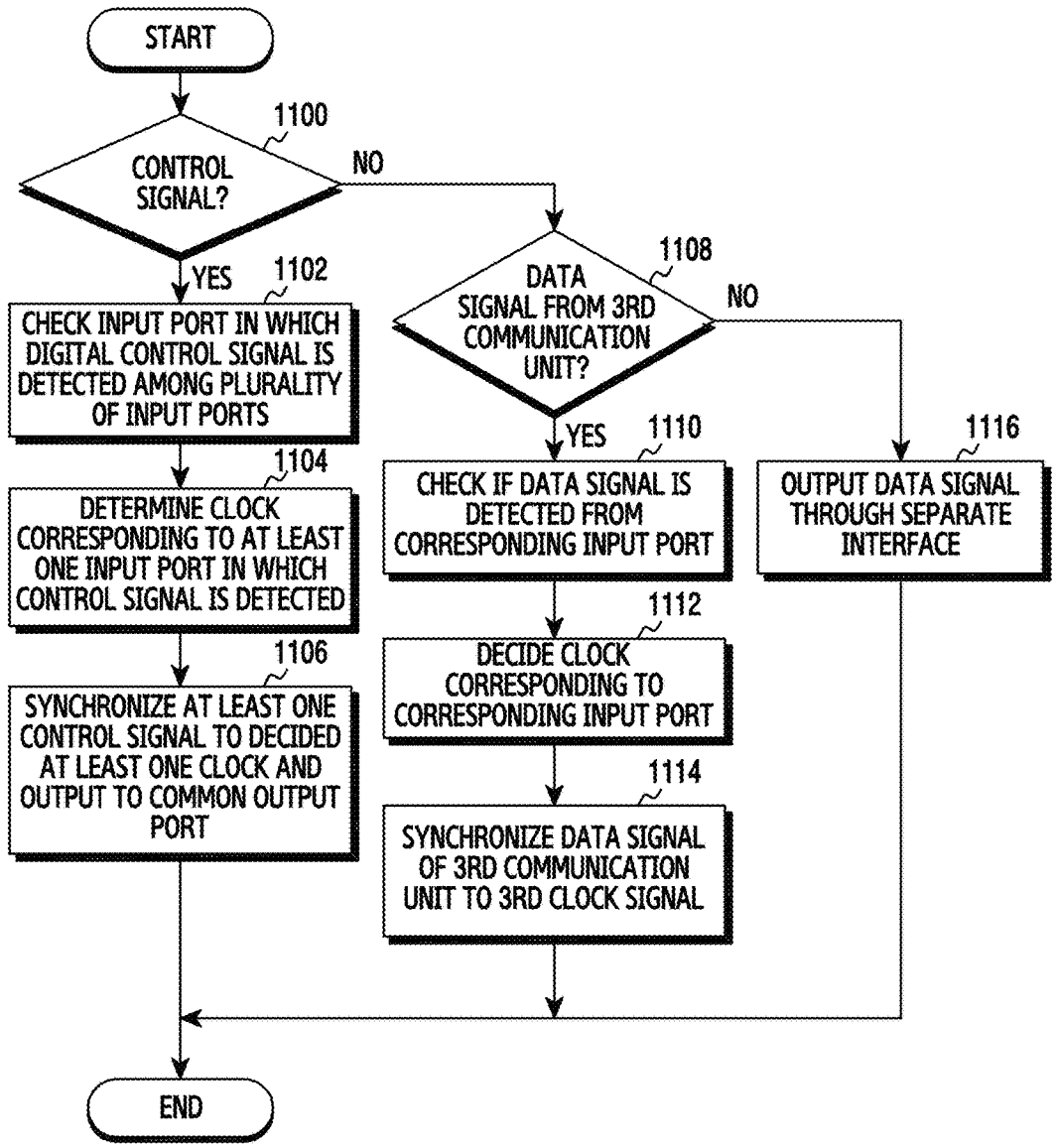
FIG. 11 is an operation flowchart of a first interface unit, according to an embodiment of the present disclosure.

FIG. 11 is an operation flowchart of a first interface unit, according an embodiment of the present disclosure.

Referring to FIG. 11, in step 1100, the first interface unit 130 determines whether a digital signal received through an input port is a control signal.

If the received digital signal is the control signal, in step 1102, the first interface unit 130 determines the input port in which the control signal is detected among a plurality of input ports. For example, the first interface unit 130 determines whether the control signal is detected through a first input port, whether the control signal is detected through a second input port, and whether the control signal is detected through a third input port.

In step 1104, the first interface unit 130 determines a clock corresponding to at least one input port in which the control signal is detected. For example, if the control signal is detected through the first input port, the first interface unit 130 determines a first clock used in a first communication unit. If the control signal is detected through the second input port, the first interface unit 130 determines a second clock used in a second communication unit. If the control signal is detected through the third input port, the first interface unit 130 determines a third clock used in a third communication unit.

In step 1106, the first interface unit 130 synchronizes at least one control signal to the determined at least one clock, and outputs the synchronized signal to a common output port. For example, the control signal received through the first input port is outputted in synchronization with the first clock used in the first communication unit. The control signal received through the second input port is outputted in synchronization with the second clock used in the second communication unit. The control signal received through the third input port is outputted in synchronization with the third clock used in the third communication unit.

Referring back to step 1100, if the received digital signal is not the control signal, i.e., if the received digital signal is a data signal, in step 1108, the first interface unit 130 determines if the received digital signal is the data signal from the third communication unit.

If the received digital signal is the data signal from the third communication unit, in step 1110, the first interface unit 130 determines whether the data signal of the third communication unit is detected from a corresponding input port.

In step 1112, the first interface unit 130 determines a clock corresponding to the corresponding input port. For example, the first interface unit 130 selects the third clock used in the third communication unit.

In step 1114, the first interface unit 130 synchronizes the data signal of the third communication unit with the third clock, and outputs the synchronized signal.

Referring back to step 1108, if the received digital signal is not the data signal from the third communication unit, i.e., if the received digital signal is a data signal from the first communication unit or the second communication unit, in step 1116, the first interface unit 130 outputs the data signal of the first communication unit or second communication unit to the processor 140 through a separate interface.

For example, in FIG. 10, the data signal from the first communication unit is outputted to the second interface unit 150 of the processor 140 through a separate interface for the first communication unit, and the data signal from the second communication unit is outputted to the second interface unit 150 of the processor 140 through a separate interface for the second communication unit.

Figure 12:
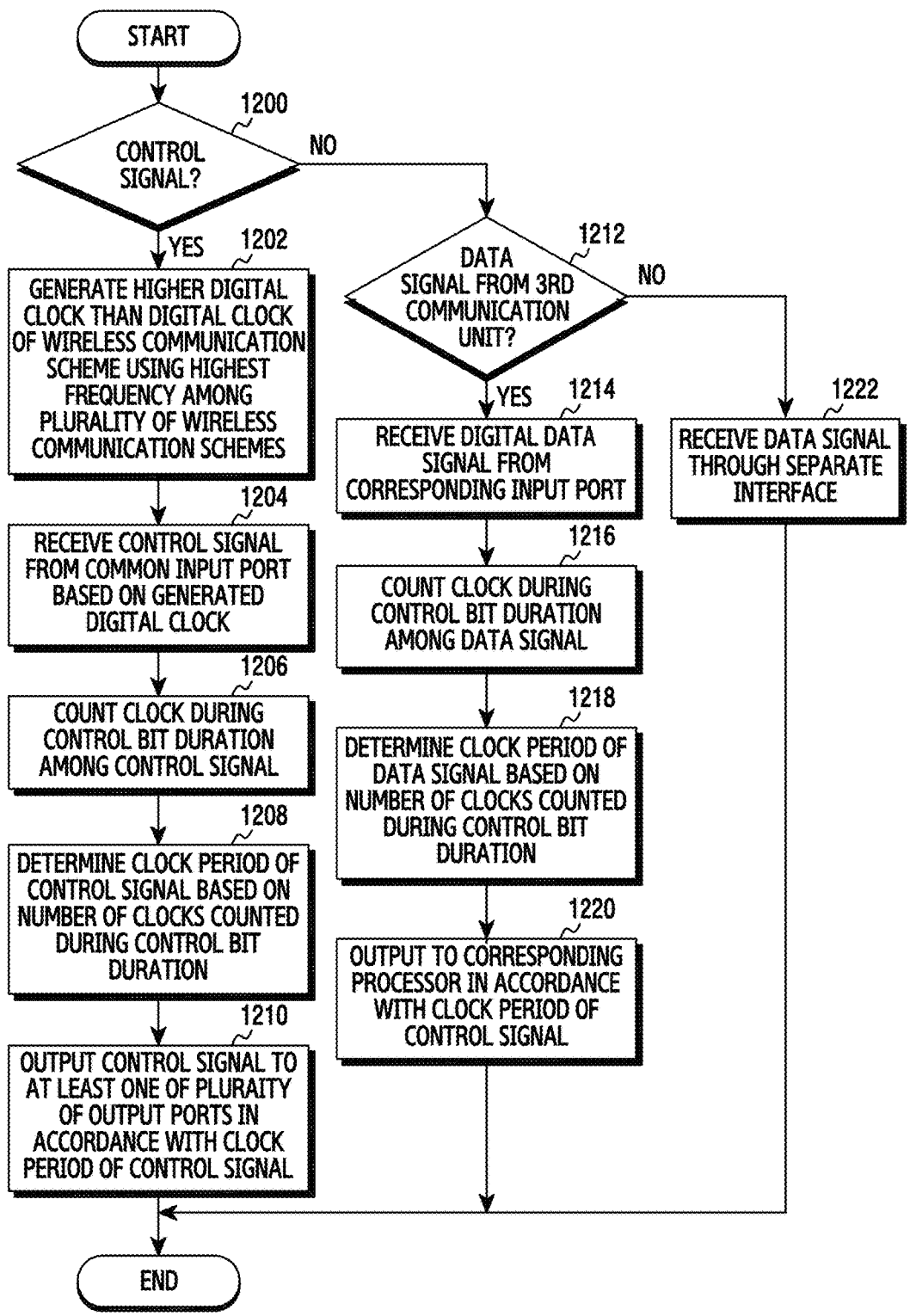
FIG. 12 is an operation flowchart of a second interface unit, according to an embodiment of the present disclosure.

FIG. 12 is an operation flowchart of a second interface unit, according to an embodiment of the present disclosure.

Referring to FIG. 12, in step 1200, the second interface unit 150 determines whether a digital signal received through an input port is a control signal.

If the received digital signal is the control signal, in step 1202, the second interface unit 150 generates a higher digital clock than a digital clock of a wireless communication scheme that uses the highest frequency among a plurality of wireless communication schemes. For example, the second interface unit 150 generates a digital clock having a period that is shorter than the periods of clocks used in a first communication unit, a second communication unit, and a third communication unit.

In step 1204, the second interface unit 150 receives at least one control signal from a common input port, based on the generated digital clock. For example, as shown and described with respect to FIG. 4A, the second interface unit 150 receives the control signal 403 based on a clock period 404 that is shorter than a clock period used in the second interface unit 150.

In step 1206, the second interface unit 150 counts a clock during a control bit (e.g., start bit) duration among the received control signal.

In step 1208, the second interface unit 150 determines a period of the control signal, based on the number of clock generations counted during the control bit duration. For example, as shown and described with respect to FIGS. 6A to 6C, the second interface unit 150 determines how many clock generations are counted during the start bit duration. For example, as in FIG. 6A, if six clock generations are counted during the start bit duration, the second interface unit 150 determines the control signal to be a control signal of the first communication unit. As in FIG. 6B, if four clock generations are counted during the start bit duration, the second interface unit 150 determines the control signal to be a control signal of the second communication unit. As in FIG. 6C, if two clock generations are counted during the start bit duration, the second interface unit 150 determines the control signal to be a control signal of the third communication unit.

In step 1210, the second interface unit 150 outputs the control signal to at least one of a plurality of output ports in accordance with a clock period of the control signal. For example, if the control signal is determined to be the control signal of the third communication unit, the second interface unit 150 outputs the control signal to a third data bus of a processor processing the control signal of the third communication unit. If the control signal is determined to be the control signal of the second communication unit, the second interface unit 150 outputs the control signal to a second data bus of a processor processing the control signal of the second communication unit. If the control signal is determined to be the control signal of the first communication unit, the second interface unit 150 outputs the control signal to a first data bus of a processor processing the control signal of the first communication unit.

Referring back to step 1200, if the received digital signal is not the control signal, i.e., if the received digital signal is a data signal, in step 1212, the second interface unit 150 determines whether the received digital signal is a data signal from the third communication unit.

If the received digital signal is the data signal from the third communication unit, in step 1214, the second interface unit 150 receives the data signal of the third communication unit based on a clock of the third communication unit. For example, as shown and described with respect to FIG. 4A, the second interface unit 150 receives the data signal 408 based on a clock period 409 that is shorter than a clock period used in the first interface unit 130.

In step 1216, the second interface unit 150 counts a clock during a control bit (e.g., start bit) duration among the data signal of the third communication unit.

In step 1218, the second interface unit 150 determines a period of the data signal of the third communication unit, based on the number of clock generations counted during the control bit duration. For example, as shown and described with respect to FIG. 6A to 6C, the second interface unit 150 determines how many clock generations are counted during the start bit duration. For example, as in FIG. 6A, if six clock generations are counted during the start bit duration, the second interface unit 150 determines the data signal to be a data signal of the first communication unit. As in FIG. 6B, if four clock generations are counted during the start bit duration, the second interface unit 150 determines the data signal to be a data signal of the second communication unit. As in FIG. 6C, if two clock generations are counted during the start bit duration, the second interface unit 150 determines the data signal to be a data signal of the third communication unit.

In step 1220, the second interface unit 150 outputs the data signal to at least one of a plurality of output ports in accordance with a clock period of the data signal. For example, if the data signal is determined to be the data signal of the third communication unit, the second interface unit 150 outputs the data signal to a third data bus of a processor processing the data signal of the third communication unit. If the data signal is determined to be the data signal of the second communication unit, the second interface unit 150 outputs the data signal to a second data bus of a processor processing the data signal of the second communication unit. If the data signal is determined to be the data signal of the first communication unit, the second interface unit 150 outputs the data signal to a first data bus of a processor processing the data signal of the first communication unit.

Referring back to step 1212, if the received digital signal is not the data signal from the third communication unit, i.e., if the received digital signal is a data signal from the first communication unit or the second communication unit, in step 1222, the second interface unit 150 receives the data signal of the first communication unit or second communication unit through a separate interface.

For example, in FIG. 10, the data signal from the first communication unit is received through a separate interface for the first communication unit, and the data signal from the second communication unit is received through a separate interface for the second communication unit.

Figure 13:
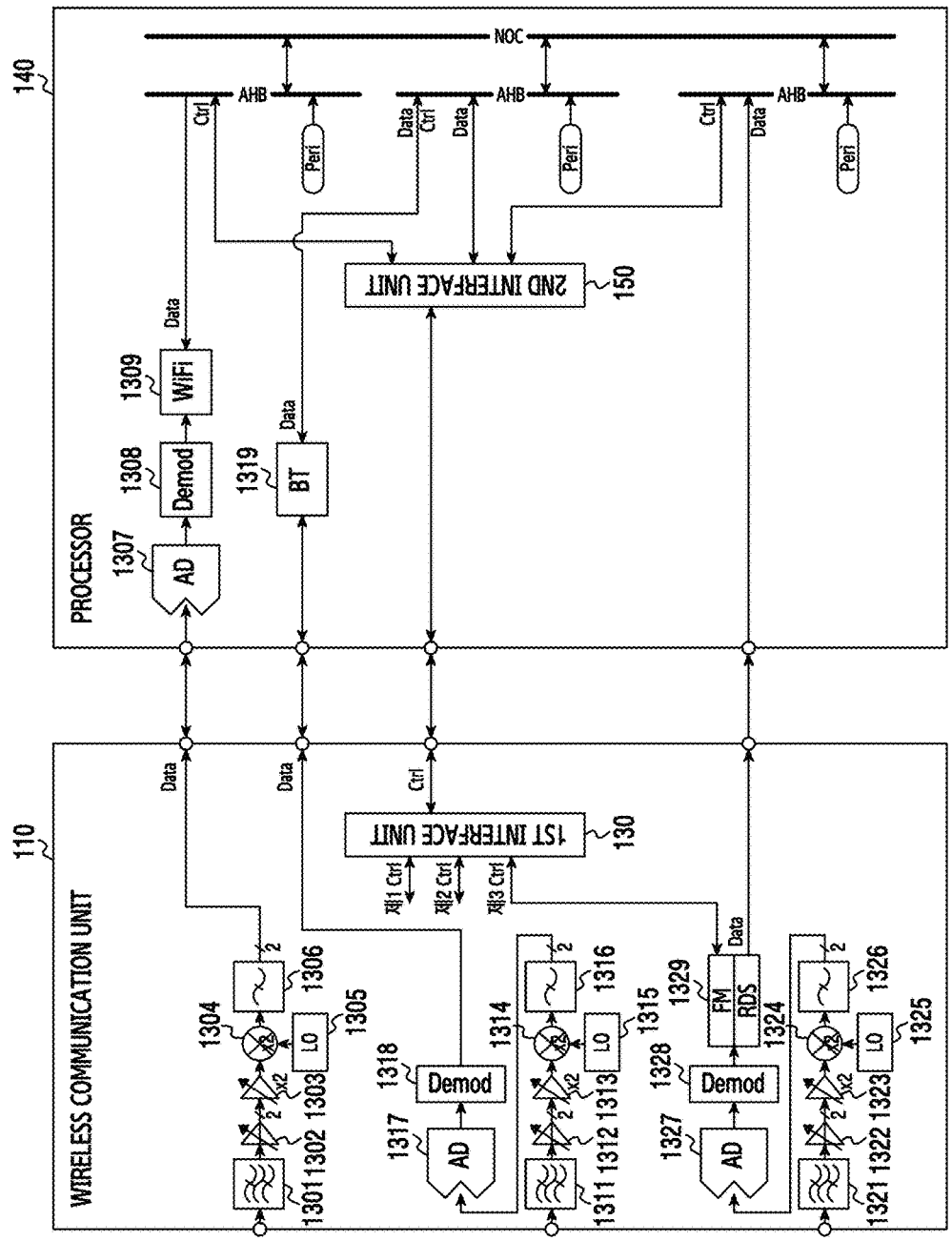
FIG. 13 is a block diagram illustrating a wireless communication device, according to an embodiment of the present disclosure.

FIG. 13 is a block diagram illustrating a wireless communication device according to an embodiment of the present disclosure.

Referring to FIG. 13, the wireless communication device includes a plurality of wireless communication units 110 and a plurality of processors 140. Although not illustrated, the wireless communication device may further include a memory, a microphone, a speaker, and a display. The wireless communication device including three wireless communication units is described as an example, but the wireless communication device may include any number of wireless communication units.

The wireless communication unit includes a first communication unit of a WiFi communication scheme, a second communication unit of a Bluetooth communication scheme, and a third communication unit receiving an FM radio signal.

To perform a reception function, the first communication unit includes a band select filter 1301, an LNA 1302, a signal amplifier 1303, a mixer 1304, an LO 1305, a channel select filter 1306, an A/D converter 1307, a demodulator 1308, and a WiFi communication modem 1309. Some constituent elements (i.e., the AD converter 1307, the demodulator 1308, and the WiFi communication modem 1309) may be included in the processor 140.

The band select filter 1301, LNA 1302, signal amplifier 1303, mixer 1304, LO 1305, channel select filter 1306, A/D converter 1307, demodulator 1308, and WiFi communication modem 1309 of FIG. 13 perform the same functions as the band select filter 701, LNA 702, signal amplifier 703, mixer 704, LO 705, channel select filter 706, A/D converter 707, demodulator 708, and WiFi communication modem 709 of FIG. 7.

To perform a reception function, the second communication unit includes a band select filter 1311, a LNA 1312, a signal amplifier 1313, a mixer 1314, a LO 1315, a channel select filter 1316, an A/D converter 1317, a demodulator 1318, and a Bluetooth communication modem 1319. Some constituent elements (i.e., the Bluetooth communication modem 1319) may be included in the processor 140.

The band select filter 1311, LNA 1312, signal amplifier 1313, mixer 1314, LO 1315, channel select filter 1316, A/D converter 1317, demodulator 1318, and Bluetooth communication modem 1319 of FIG. 13 perform the same functions as the band select filter 711, LNA 712, signal amplifier 713, mixer 714, LO 715, channel select filter 716, A/D converter 717, demodulator 718, and Bluetooth communication modem 719 of FIG. 7.

To perform a reception function, the third communication unit includes a band select filter 1321, an LNA 1322, a signal amplifier 1323, a mixer 1324, an LO 1325, a channel select filter 1326, an A/D converter 1327, a demodulator 1328, and an FM radio reception modem 1329.

The band select filter 1321, LNA 1322, signal amplifier 1323, mixer 1324, LO 1325, channel select filter 1326, A/D converter 1327, demodulator 1328, and FM radio reception modem 1329 of FIG. 13 perform the same functions as the band select filter 721, LNA 722, signal amplifier 723, mixer 724, LO 725, channel select filter 726, A/D converter 727, demodulator 728. and FM radio reception modem 729 of FIG. 7.

A common output interface is constructed between the first interface unit 130 and the second interface unit 150. For example, the first interface unit 130 and the second interface unit 150 each include of a multiplexer and a demultiplexer. The multiplexer may select and output one of a plurality of inputs, and the demultiplexer may select one of a plurality of outputs and provide one input. Accordingly, to connect the plurality of wireless communication units, one common interface, not a plurality of interfaces, for a control signal is used between the first interface unit 130 and the second interface unit 150.

The first interface unit 130 synchronizes a control signal from the wireless communication unit 110, to a clock of the wireless communication unit 110, and outputs the synchronized signal to the second interface unit 150 of the processor 140.

The first interface unit 130 receives a control signal from the processor 140, counts the number of clock generations during a single bit duration of the control signal, and outputs the control signal to the corresponding wireless communication unit 110 based on the counted number of clock generations.

The second interface unit 150 synchronizes a control signal from the processor 140, to a clock of the wireless communication unit 110, and outputs the synchronized signal to the first interface unit 130 of the wireless communication unit 110.

The second interface unit 150 receives a control signal from the wireless communication unit 110, counts the number of clock generations during a single bit duration of the control signal, and outputs the control signal to the corresponding processor 140 based on the counted number of clock generations.

The processor 140 includes a plurality of data buses (e.g., AHB data buses), and forwards a control signal corresponding to a corresponding communication scheme through the corresponding data bus.

However, because some constituent elements (i.e., the A/D converter 1307, the demodulator 1308, and the WiFi communication modem 1309) of the first communication unit are included in the processor 140, a separate interface is required to provide data from the first communication unit to the processor 140 or to provide data from the processor 140 to the first communication unit.

Similarly, because some constituent elements (i.e., the Bluetooth communication modem 1319) of the second communication unit are included in the processor 140, a separate interface is required to provide data from the second communication unit to the processor 140 or to provide data from the processor 140 to the second communication unit.

Specifically, control signals of the first communication unit, the second communication unit, and the third communication unit are provided to the processor 140 through the first interface unit 130, but data signals of the first communication unit, the second communication unit, and the third communication unit are provided to the processor 140 through separate respective interfaces.

Similarly, control signals for the first communication unit, the second communication unit, and the third communication unit are provided to the wireless communication unit 110 through the second interface unit 150, but data signals for the first communication unit, the second communication unit, and the third communication unit are provided to the wireless communication unit 110 through the separate respective interfaces.

Although forgoing description was described that the A/D converter 1307 is operated in the first communication unit, the A/D converter 1307 may be operated in the processor as illustrated in FIG. 13.

Figure 14:
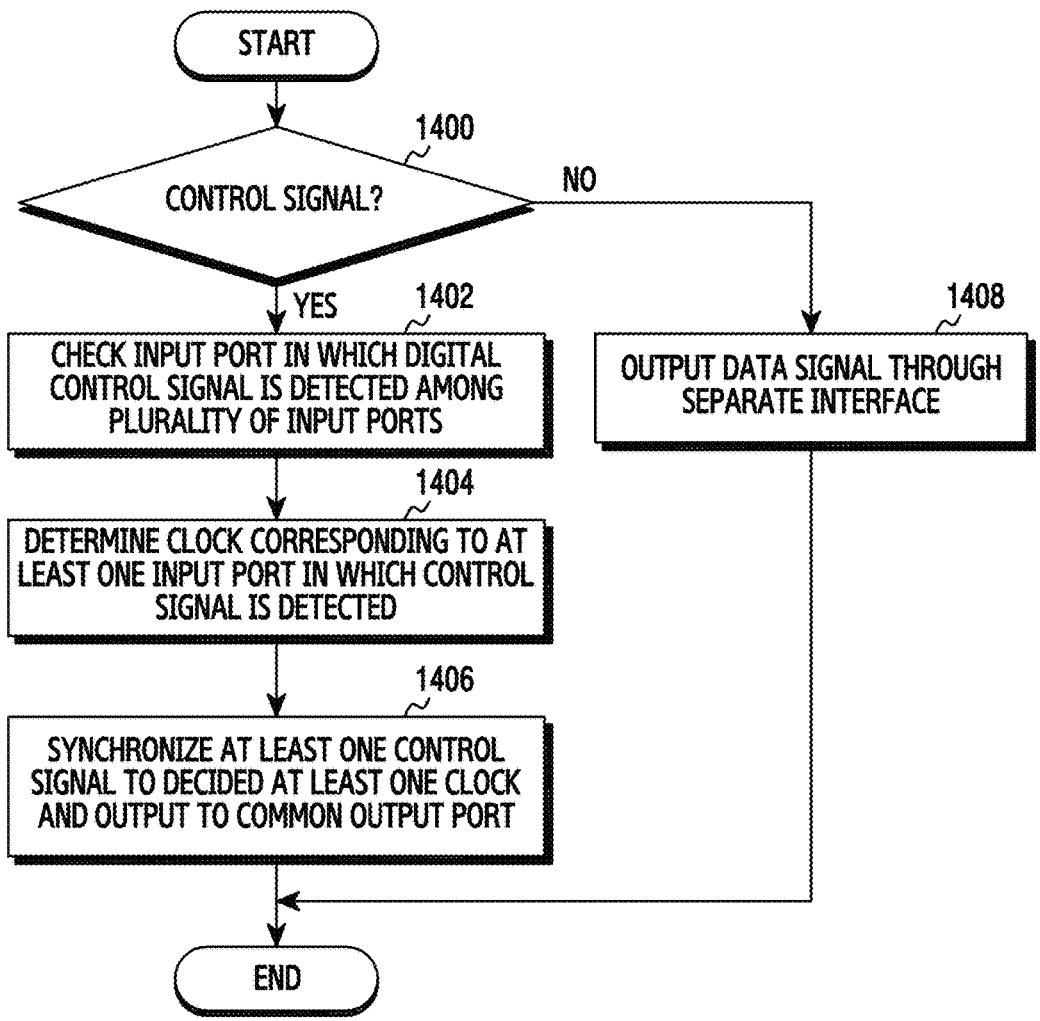
FIG. 14 is an operation flowchart of a first interface unit, according to an embodiment of the present disclosure.

FIG. 14 is an operation flowchart of a first interface unit, according an embodiment of the present disclosure.

Referring to FIG. 14, in step 1400, the first interface unit 130 determines whether a digital signal received through an input port is a control signal.

If the digital signal is the control signal, in step 1402, the first interface unit 130 determines the input port in which the control signal is detected among a plurality of input ports. For example, the first interface unit 130 determines whether the control signal is detected through a first input port, whether the control signal is detected through a second input port, and whether the control signal is detected through a third input port.

In step 1404, the first interface unit 130 determines a clock corresponding to at least one input port in which the control signal is detected. For example, if the control signal is detected through the first input port, the first interface unit 130 determines a first clock used in a first communication unit. If the control signal is detected through the second input port, the first interface unit 130 determines a second clock used in a second communication unit. If the control signal is detected through the third input port, the first interface unit 130 determines a third clock used in a third communication unit.

In step 1406, the first interface unit 130 synchronizes at least one control signal with the determined at least one clock, and outputs the synchronized signal to a common output port. For example, the control signal received through the first input port is outputted in synchronization with the first clock used in the first communication unit. The control signal received through the second input port is outputted in synchronization with the second clock used in the second communication unit. The control signal received through the third input port is outputted in synchronization with the third clock used in the third communication unit.

Referring back to step 1400, if the received digital signal is not the control signal, i.e., if the received digital signal is a data signal from the first communication unit, the second communication unit or the third communication unit, in step 1408, the first interface unit 130 outputs the data signal of the first communication unit, the second communication unit, or the third communication unit to the processor 140 through a separate interface.

For example, in FIG. 13, the data signal from the first communication unit is outputted to the processor 140 through a separate interface for the first communication unit, and the data signal from the second communication unit is outputted to the processor 140 through a separate interface for the second communication unit, and the data signal of the third communication unit is outputted to the processor 140 through a separate interface for the third communication unit.

Figure 15:
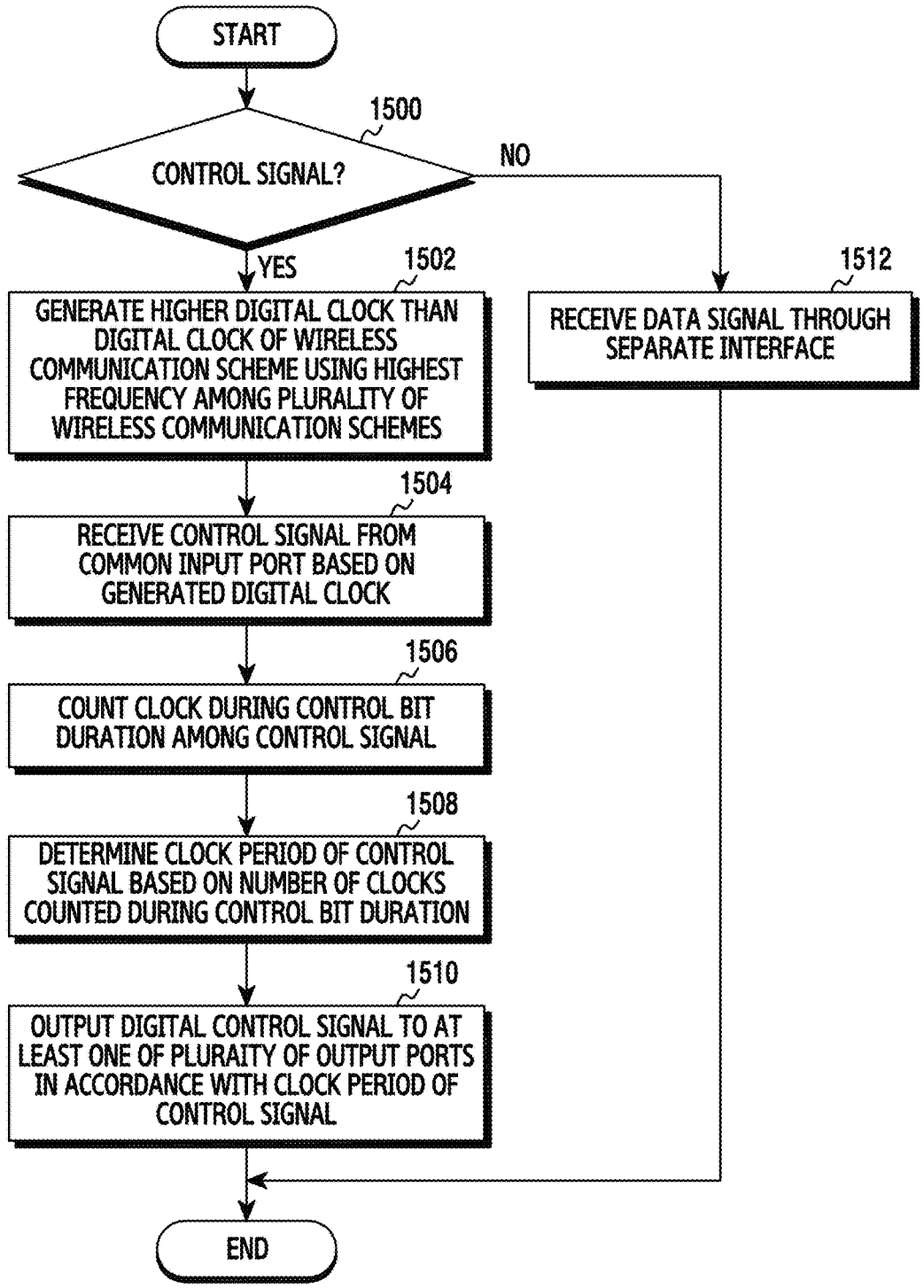
FIG. 15 is an operation flowchart of a second interface unit, according to an embodiment of the present disclosure.

FIG. 15 is an operation flowchart of a second interface unit, according to an embodiment of the present disclosure.

Referring to FIG. 15, in step 1500, the second interface unit 150 determines whether a digital signal received through an input port is a control signal.

If the digital signal is the control signal, in step 1502, the second interface unit 150 generates a higher digital clock than a digital clock of a wireless communication scheme that uses the highest frequency among a plurality of wireless communication schemes. For example, the second interface unit 150 generates a digital clock having a period that is shorter than the periods of clocks used in a first communication unit, a second communication unit, and a third communication unit.

In step 1504, the second interface unit 150 receives at least one control signal from a common input port, based on the generated digital clock. For example, as shown and described with respect to FIG. 4A, the second interface unit 150 receives the control signal 403 based on a clock period 404 that is shorter than a clock period used in the second interface unit 150.

In step 1506, the second interface unit 150 counts a clock during a control bit (e.g., start bit) duration among the received control signal.

In step 1508, the second interface unit 150 determines a period of the control signal, based on the number of clock generations that are counted during the control bit duration. For example, as shown and described with respect to FIGS. 6A to 6C, the second interface unit 150 determines how many clock generations are counted during the start bit duration. For example, as in FIG. 6A, if six clock generations are counted during the start bit duration, the second interface unit 150 determines the control signal to be a control signal of the first communication unit. As in FIG. 6B, if four clock generations are counted during the start bit duration, the second interface unit 150 determines the control signal to be a control signal of the second communication unit. As in FIG. 6C, if two clock generations are counted during the start bit duration, the second interface unit 150 determines the control signal to be a control signal of the third communication unit.

In step 1510, the second interface unit 150 outputs the control signal to at least one of a plurality of output ports in accordance with a clock period of the control signal. For example, if the control signal is determined to be the control signal of the third communication unit, the second interface unit 150 outputs the control signal to a third data bus of a processor processing the control signal of the third communication unit. If the control signal is determined to be the control signal of the second communication unit, the second interface unit 150 outputs the control signal to a second data bus of a processor processing the control signal of the second communication unit. If the control signal is determined to be the control signal of the first communication unit, the second interface unit 150 outputs the control signal to a first data bus of a processor processing the control signal of the first communication unit.

Referring back to step 1500, if the received digital signal is not the control signal, in step 1512, the second interface unit 150 receives the data signal of the first communication unit, the second communication unit, or the third communication unit through a separate interface.

For example, in FIG. 13, the data signal from the first communication unit is received through a separate interface for the first communication unit, and the data signal from the second communication unit is received through a separate interface for the second communication unit. The data signal from the third communication unit is received through a separate interface for the third communication unit.

As described above, embodiments of the present disclosure detect a frequency corresponding to a corresponding communication scheme by using a common interface between a communication module and a control module in a wireless communication device, thereby reducing power consumption and reducing even a chip size.

Methods according to the embodiments may be implemented in a form of hardware, software, or a combination of hardware and software.

If the methods are implemented by the software, a computer-readable storage medium storing one or more programs (i.e., software modules) may be provided. The one or more programs stored in the computer-readable storage medium are configured to be executable by one or more processors within an electronic device. The one or more programs may include instructions for enabling the electronic device to execute the methods according to the embodiments of the present disclosure.

These programs (i.e., software modules or software) may be stored in a random access memory (RAM), a non-volatile memory including a flash memory, a read only memory (ROM), an electrically erasable programmable ROM (EEPROM), a magnetic disc storage device, a compact disc-ROM (CD-ROM), a DVD or an optical storage device of another form, and a magnetic cassette. The programs may also be stored in a memory constructed by a combination of some or all of the above-described components. Also, each constructed memory may also be included in plural.

The programs may also be stored in an attachable storage device accessible to the electronic device through a communication network such as, for example, the Internet, an intranet, a local area network (LAN), a wireless LAN (WLAN) and a storage area network (SAN), or a communication network constructed by a combination of them. This storage device may access the electronic device through an external port.

A separate storage device on the communication network may access a portable electronic device.

The present embodiments may be utilized in conjunction with the manufacture of integrated circuits, systems on chips, or chip sets. In general, a plurality of identical die are typically formed in a repeated pattern on a surface of a semiconductor wafer. Each die may include other structures or circuits. The individual die are cut or diced from the wafer, then packaged as an integrated circuit. One skilled in the art would know how to dice wafers and package die to produce integrated circuits. Integrated circuits so manufactured are considered part of this disclosure.

While the disclosure has been shown and described with reference to certain embodiments thereof, it will be understood by those skilled in the art that various changes in form and detail may be made therein without departing from the spirit and scope of the disclosure as defined by the appended claims.

What is claimed is:

1. A wireless communication device comprising:
a plurality of wireless communication units, each wireless communication unit enabling communication using wireless signals of a different respective frequency;
a first interface device configured to synchronize a data signal received from one of the plurality of wireless communication units with a first clock corresponding to the one of the plurality of wireless communication units, and configured to output the synchronized data signal to a second interface device;
the second interface device configured to receive the synchronized data signal using a second clock having a shorter period than the first clock, count a number of periods of the second clock during at least one period of the first clock, and determine an output port for the synchronized data signal based on a result of counting the number of periods of the second clock; and
a plurality of processors for processing data signals, each processor corresponding to a respective output port of the second interface device.

2. The device of claim 1, wherein the second interface device comprises:
a second clock generator for generating the second clock;
a counter for counting the second clock; and
a demultiplexer for determining the output port of the synchronized data.

3. The device of claim 1, wherein the first interface device comprises:
a first clock generator for generating the first; and
a multiplexer for synchronizing the data signal to the first clock, and outputting the synchronized data signal to the second interface device.

4. The device of claim 1, wherein the second interface device synchronizes a second data signal provided from one of the plurality of processors, with the first clock, and outputs the second synchronized data signal to the first interface device.

5. The device of claim 1, wherein the first interface device uses the second clock to receive a second data signal from the second interface device, counts the second clock during the at least one period of the first clock, and determines a second output port based on a result of the counting.

6. The device of claim 1, wherein the plurality of wireless communication units comprises two or more of a WiFi communication unit, a Bluetooth communication unit, a near field communication (NFC) communication unit, a Zigbee communication unit, a broadcast receiving unit, and a frequency modulation (FM) communication unit.

7. The device of claim 1, wherein the data signal is comprised of a start bit, a control or data indicator bit, an address page, a read/write bit, a bit indicating a number of pieces of data, and the data.

8. The device of claim 7, wherein the second interface device counts a number of times a clock is generated within a bit period of specific data to determine the output port.

9. The device of claim 7, wherein the second interface device counts a period of the start bit, the control or data indicator bit, or the address page to determine the output port.

10. An operating method of a wireless communication device, the method comprising:
performing communication through a plurality of wireless communication units, each wireless communication unit using wireless signals of a different respective frequency;
synchronizing, through a first interface device, a data signal received from one of the plurality of wireless communication units, with a first clock corresponding to the one of the plurality of wireless communication units;
outputting the synchronized data signal from the first interface device to a second interface device;
receiving, through the second interface device, the synchronized data signal using a second clock having a shorter period than the first clock;
counting, by the second interface device, a number of periods of the second clock during at least one period of the first clock;
determining an output port for the synchronized data signal based on a result of counting the number of periods of the second clock; and
processing data signals through a plurality of processors, each processor corresponding to a respective output port of the second interface device.

11. The method of claim 10, further comprising:
synchronizing, by the second interface device, a second data signal provided from one of the plurality of processors, with the first clock; and
outputting the second synchronized data signal from the second interface device to the first interface device.

12. The method of claim 10, further comprising:
receiving, by the first interface device, a second data signal from the second interface device;
counting the second clock during the at least one period of the first clock; and
determining a second output port based on a result of the counting.

13. The method of claim 10, wherein the plurality of wireless communication units comprises two or more of a WiFi communication unit, a Bluetooth communication unit, a near field communication (NFC) communication unit, a Zigbee communication unit, a broadcast receiving unit, and a frequency modulation (FM) communication unit.

14. The method of claim 10, wherein the data signal is comprised of a start bit, a control or data indicator bit, an address page, a read/write bit, a bit indicating a number of pieces of data, and the data.

15. The method of claim 14, wherein a number of times a clock is generated within a bit period of specific data is counted to determine the output port.

16. The method of claim 14, wherein a period of the start bit, the control or data indicator bit, or the address page is counted to determine the output port.

17. A terminal comprising:
a plurality of wireless communication units;
a first interface device configured to receive data signals from the plurality of wireless communication units, synchronize a given data signal with a first clock corresponding to a wireless communication unit from which the given data signal was received, and output synchronized data signals;
a second interface device configured to receive the synchronized data signals, and configured to determine one of a plurality of output ports for a given synchronized data signal based on a period of the synchronized data signal determined by counting a number of clock generations of a second clock during a start bit duration for the given synchronized data signal; and
a plurality of processors configured to receive the synchronized data signals from the second interface device, each processor corresponding to a respective output port of the second interface device.

18. The terminal of claim 17, wherein each of the plurality of wireless communication units enables communication using wireless signals of a different respective frequency.

19. The terminal of claim 17, wherein the second clock has a period that is shorter than periods of first clocks corresponding to the plurality of wireless communication units.

20. The terminal of claim 17, wherein the second interface device determines the one of the plurality of output ports by counting a number of periods of the second clock during at least one period of the first clock.

* * * * *